United States Patent
Gan et al.

(10) Patent No.: US 6,746,804 B2
(45) Date of Patent: Jun. 8, 2004

(54) NONAQUEOUS ORGANIC ELECTROLYTES FOR LOW TEMPERATURE DISCHARGE OF RECHARGEABLE ELECTROCHEMICAL CELLS

(75) Inventors: Hong Gan, East Amherst, NY (US); Esther S. Takeuchi, East Amherst, NY (US); Robert Rubino, Williamsville, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 102 days.

(21) Appl. No.: 10/232,166

(22) Filed: Aug. 30, 2002

(65) Prior Publication Data

US 2003/0124434 A1 Jul. 3, 2003

Related U.S. Application Data

(63) Continuation-in-part of application No. 09/669,936, filed on Sep. 26, 2000, now abandoned, which is a continuation-in-part of application No. 09/133,799, filed on Aug. 13, 1998, now Pat. No. 6,153,338.
(60) Provisional application No. 60/085,532, filed on May 13, 1998.

(51) Int. Cl.$^7$ ................................................ H01M 6/16
(52) U.S. Cl. ...................... 429/326; 429/330; 429/332; 429/231.1; 429/231.4; 429/231.8; 429/231.3; 429/232; 429/217; 429/231.95; 29/623.1
(58) Field of Search ................................. 429/326, 330, 429/332, 231.1, 231.4, 231.8, 231.3, 232, 217, 231.95; 29/623.1

(56) References Cited

U.S. PATENT DOCUMENTS

| | | | |
|---|---|---|---|
| 4,252,876 A | 2/1981 | Koch | 429/197 |
| 4,957,833 A | 9/1990 | Daifuku et al. | 429/197 |
| 5,256,504 A | 10/1993 | Okuno et al. | 429/197 |
| 5,292,601 A | 3/1994 | Sugeno et al. | 429/197 |
| 5,310,553 A | 5/1994 | Simon et al. | 429/212 |
| 5,358,620 A | 10/1994 | Golovin et al. | |
| 5,478,673 A | 12/1995 | Funatsu | 429/197 |
| 5,498,492 A | 3/1996 | Hara et al. | 429/212 |
| 5,523,179 A | 6/1996 | Chu | 429/104 |
| 5,580,684 A | 12/1996 | Yokoyama et al. | |
| 5,643,695 A | 7/1997 | Barker et al. | 429/197 |
| 5,660,951 A | 8/1997 | Yoshida | 429/218 |
| 5,712,059 A | 1/1998 | Barker et al. | 429/197 |
| 5,783,333 A | 7/1998 | Mayer | 429/223 |
| 5,856,043 A | 1/1999 | Ohsaki et al. | 429/218 |
| 5,962,720 A | 10/1999 | Gan et al. | 558/277 |
| 6,007,947 A | 12/1999 | Mayer | 429/231.1 |
| 6,153,338 A | 11/2000 | Gan et al. | |

FOREIGN PATENT DOCUMENTS

| | | |
|---|---|---|
| EP | 0634805 A1 | 6/1993 |
| EP | 0622862 A1 | 2/1994 |
| JP | H8162153 | 6/1996 |
| JP | 09063645 | 7/1997 |
| JP | 09245830 | 9/1997 |

OTHER PUBLICATIONS

E.S. Takeuchi et al., J. Electrochem Soc. 144, 1944–1948 (1997).

Primary Examiner—Laura Weiner
(74) Attorney, Agent, or Firm—Michael F. Scalise

(57) ABSTRACT

An alkali metal secondary electrochemical cell, and preferably a lithium ion cell, activated with an equilibrated quaternary solvent system, is described. The solvent system comprises a mixture of dialkyl carbonates and cyclic carbonates, and preferably a quaternary mixture of dimethyl carbonate, diethyl carbonate, ethylmethyl carbonate and ethylene carbonate with dimethyl carbonate, diethyl carbonate and ethylmethyl carbonate in an equilibrated molar mixture. Lithium ion cells activated with this electrolyte have good room temperature cycling characteristics and excellent low temperature discharge behavior.

29 Claims, 8 Drawing Sheets

NONAQUEOUS ORGANIC ELECTROLYTES FOR LOW TEMPERATURE DISCHARGE OF RECHARGEABLE ELECTROCHEMICAL CELLS

CROSS-REFERENCE TO RELATED APPLICATION

This application is a continuation in part of application Ser. No. 09/669,936 filed Sep. 26, 2000, abandoned, which is a continuation in part of U.S. application Ser. No. 09/133, 799 filed Aug. 13, 1998, now U.S. Pat. No. 6,153,338 to Gan et al., which, in turn, claims priority based on U.S. provisional application Serial No. 60/085,532, filed May 13, 1998.

BACKGROUND OF INVENTION

1. Field of the Invention

The present invention generally relates to the conversion of chemical energy to electrical energy, and more particularly, to a nonaqueous electrolyte activating a rechargeable alkali metal electrochemical cell, particularly a lithium ion cell, designed for long cycle life and low temperature charge/discharge applications. These characteristics are provided, in part, by the activating electrolyte being a quaternary mixture of dimethyl carbonate, diethyl carbonate, ethyl methyl carbonate and ethylene carbonate with the former three carbonates being in their equilibrated molar mixture.

2. Prior Art

Japanese patent application disclosure No. H8-162153 (Toshiba Battery Co.) relates to a secondary lithium ion battery activated with a mixed solvent electrolyte of ethyl methyl carbonate (EMC), diethyl carbonate (DEC), dimethyl carbonate (DMC) and ethylene carbonate (EC). The cell in this publication is stated to be capable of cycling at temperatures down to about −20° C. However, this Japanese patent application disclosure makes no mention of providing the constituents of DMC:EMC:DEC in an equilibrated molar mixture. The problem is that as the cell is cycled between a discharged and a charged state, DMC and DEC undergo an ester exchange reaction to produce product EMC. If the ternary solvents of DMC:EMC:DEC are not filled into the cell in an equilibrated molar mixture, cell performance changes as DMC and DEC react to form EMC or EMC disproportionates to form DMC and DEC. In that light, a cell that is initially rated for discharge at −20° C. may not be capable of such performance after several cycles as the percentages of DMC, DEC and EMC change. Such unpredictability is not acceptable in a lithium ion cell operating at such low temperatures.

According to the present invention, low temperature discharge and capacity fade problems are avoided by activating an alkali metal rechargeable cell, and particularly a lithium ion cell, with an equilibrated quaternary mixture of organic carbonate solvents in the electrolyte. The carbonate solvents and their mixture ratio are carefully selected to provide a lithium ion cell capable of discharge at temperatures below −20° C. and that exhibits good cycling characteristics. At the same time, the cycleability of the present invention cells at room temperature is maintained as good as rechargeable cells of a similar electrode chemistry activated with conventional binary carbonate solvent electrolytes.

SUMMARY OF THE INVENTION

The object of the present invention is, therefore, to improve the low temperature charge/discharge performance of lithium ion cells by activating them with an electrolyte comprising an equilibrated quaternary mixture of nonaqueous organic carbonate solvents. A further objective of the present invention is to provide such electrolytes in lithium ion cells to improve their cycle life in comparison to cells of similar electrode chemistries activated with conventional binary carbonate and mixed carbonate/ester electrolytes.

For that purpose, the present invention is directed to an equilibrated quaternary mixed solvent system for an electrolyte activating a lithium ion cell, wherein the solvent system contains only organic carbonates. In particular, the preferred solvent mixture is EC:DMC:EMC:DEC, in which EC is in the range of about 20% to about 50%, DMC is in the range of about 12% to about 75%, EMC is in the range of about 5% to about 45% and DEC is in the range of about 3% to about 45%, by mole. This solvent system provides the cell with good low temperature discharge and cycling characteristics.

These and other objects of the present invention will become increasingly more apparent to those skilled in the art by reference to the following description and to the appended drawings.

DETAILED DESCRIPTION OF THE DRAWINGS

DETAILED DESCRIPTION OF THE PREFERRED EMBODIMENTS

Figure 1:
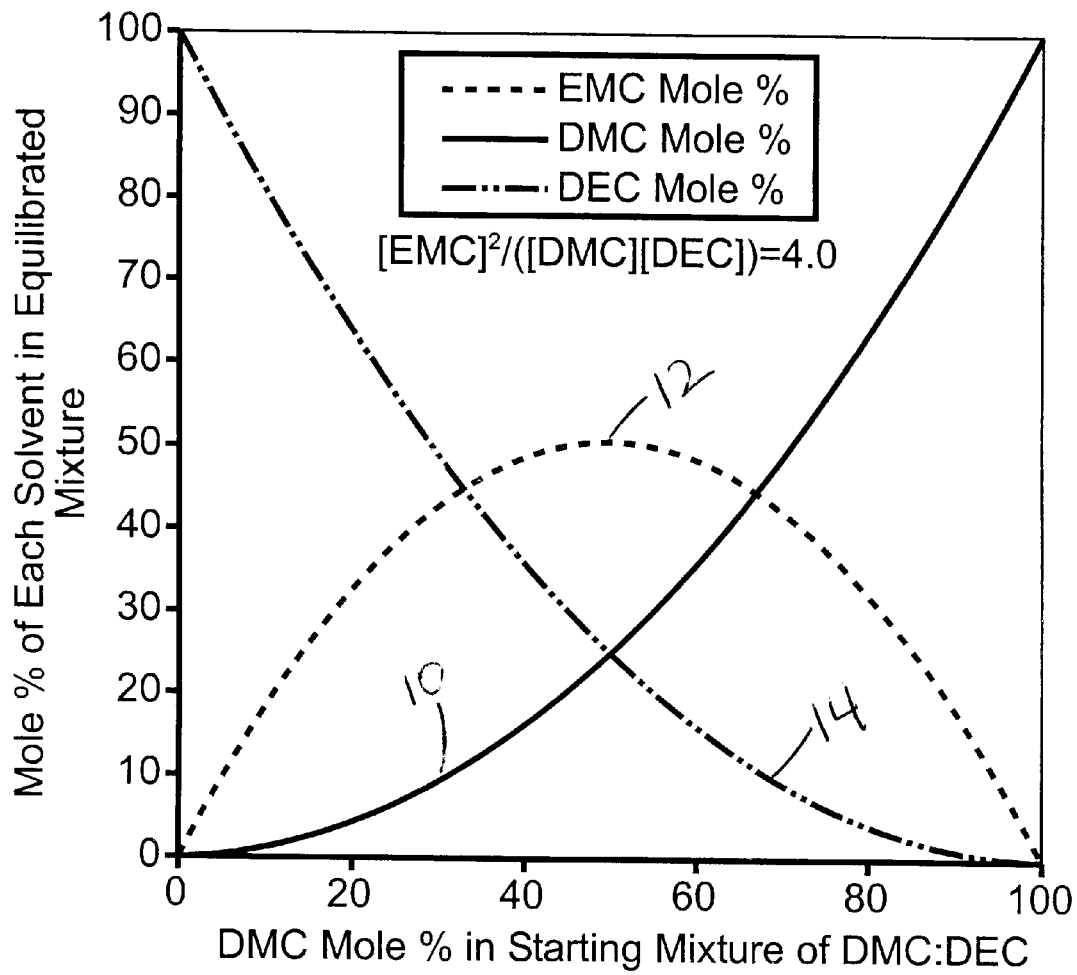
FIG. 1 is a graph of equilibrated molar mixtures of DMC:EMC:DEC based on a starting mixture of DMC:DEC.

A secondary electrochemical cell constructed according to the present invention includes an anode active material selected from Groups IA, IIA, or IIIB of the Periodic Table of Elements, including the alkali metals lithium, sodium, potassium, etc. The preferred anode active material comprises lithium.

In secondary electrochemical systems, the anode electrode comprises a material capable of intercalating and de-intercalating the alkali metal, and preferably lithium. A carbonaceous anode comprising any of the various forms of carbon (e.g., coke, graphite, acetylene black, carbon black, glassy carbon, etc.) that are capable of reversibly retaining the lithium species, is preferred. Graphite is particularly preferred due to its relatively high lithium-retention capacity. Regardless of the form of the carbon, fibers of the carbonaceous material are particularly advantageous because they have excellent mechanical properties which permit them to be fabricated into rigid electrodes capable of withstanding degradation during repeated charge/discharge cycling. Moreover, the high surface area of carbon fibers allows for rapid charge/discharge rates. A preferred carbonaceous material for the anode of a secondary electrochemical cell is described in U.S. Pat. No. 5,443,928 to Takeuchi et al., which is assigned to the assignee of the present invention and incorporated herein by reference.

A typical secondary cell anode is fabricated by mixing, by weight, about 90% to 97% graphite with about 3% to 10% of a binder material which is preferably a fluoro-resin powder such as polytetrafluoroethylene (PTFE), polyvinylidene fluoride (PVDF), polyethylenetetrafluoroethylene (ETFE), polyamides and polyimides, and mixtures thereof. This electrode active admixture is provided on a current collector such as of a nickel, stainless steel, or copper foil or screen by casting, pressing, rolling or otherwise contacting the active admixture thereto.

The anode component further has an extended tab or lead of the same material as the anode current collector, i.e., preferably nickel, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The cathode of a secondary cell preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

Before fabrication into an electrode for incorporation into an electrochemical cell, the lithiated active material is preferably mixed with a conductive additive. Suitable conductive additives include acetylene black, carbon black and/or graphite. Metals such as nickel, aluminum, titanium and stainless steel in powder form are also useful as conductive diluents when mixed with the above listed active materials. The electrode further comprises a fluoro-resin binder, preferably in a powder form, such as PTFE, PVDF, ETFE, polyamides and polyimides, and mixtures thereof.

To discharge such secondary cells, lithium ions comprising the cathode are intercalated into the carbonaceous anode by applying an externally generated electrical potential to recharge the cell. The applied recharging electrical potential serves to draw the lithium ions from the cathode material, through the electrolyte and into the carbonaceous anode to saturate the carbon comprising the anode. The resulting $Li_xC_6$ electrode has an x ranging between 0.1 and 1.0. The cell is then provided with an electrical potential and discharged in a normal manner.

An alternate secondary cell construction comprises intercalating the carbonaceous material with the active alkali material before the anode is incorporated into the cell. In this case, the cathode body can be solid and comprise, but not be limited to, such materials as manganese dioxide, silver vanadium oxide, copper silver vanadium oxide, titanium disulfide, copper oxide, copper sulfide, iron sulfide, iron disulfide and fluorinated carbon. However, this approach is compromised by problems associated with handling lithiated carbon outside of the cell. Lithiated carbon tends to react with explosive results when contacted by air.

The secondary cell of the present invention includes a separator, typically a fabric, placed between the anode and cathode electrodes. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

Illustrative separator materials include fabrics woven from fluoropolymeric fibers of polyethylenetetrafluoroethylene and polyethylenechlorotrifluoroethylene used either alone or laminated with a fluoropolymeric microporous film. Other suitable separator materials include non-woven glass, polypropylene, polyethylene, glass fiber materials, ceramics, a polytetraflouroethylene membrane commercially available under the designation ZITEX (Chemplast Inc.), a polypropylene membrane commercially available under the designation CELGAD (Celanese Plastic Company, Inc.) and a membrane commercially available under the designation DEXIGLAS (C. H. Dexter, Div., Dexter Corp.).

The choice of an electrolyte solvent system for activating an alkali metal electrochemical cell, and particularly a fully charged lithium ion cell is very limited due to the high potential of the cathode material (up to 4.3V vs. $Li/Li^+$ for $Li_{1-x}CoO_2$) and the low potential of the anode material (0.01V vs. $Li/Li^+$ for graphite). Organic carbonates are generally used in the electrolyte solvent system for such battery chemistries because they exhibit high oxidative stability toward cathode materials and good kinetic stability toward anode materials. Table 1 lists the physical properties of various carbonate solvents.

TABLE 1

| Solvent | MP(° C.) | BP(° C.) | $\epsilon(25°$ C.) | $\eta$(cP, 20° C.) |
| --- | --- | --- | --- | --- |
| EC | 36.4 | 238 | 95.3 | 1.85 (40° C.) |
| PC | −54.5 | 242 | 64.4 | 2.51 |
| BC | −53 | 240 | 53 | 3.2 |
| VC | 22 | 162 | — | — |
| DMC | 3 | 90 | 3.12 | 0.59 |
| EMC | −55 | 109 | — | 0.66 (25° C.) |
| DEC | −43 | 127 | 2.82 (20° C.) | 0.75 |
| DPC | — | 167 | — | — |
| MFC | −49 | 130 | — | 0.9 |
| EPC | −81 | 148 | — | 0.92 (25° C.) |

From Table 1, it can be seen that the cyclic carbonates ethylene carbonate (EC) and vinylene carbonate (VC) have melting points higher than 0° C., as described in U.S. Pat. No. 5,712,059 to Barker et al. Therefore, while electrolytes prepared with these solvents perform well at room temperature, they may or may not work well at lower temperatures due to electrolyte freezing. Instead, the high dielectric constant solvents propylene carbonate (PC) and butylene carbonate (BC) are preferred for low temperature applications due to their low melting points. However, since those solvents cannot passivate a graphite electrode during lithiation, they are not suitable for lithium ion cells comprising graphite as an anode active material. For graphite electrodes, EC and VC are still the best choice for use as the high dielectric constant solvent components.

All linear carbonate solvents other than DMC have melting points lower than −40° C. Unfortunately, they also have higher viscosities than that of DMC. For example, although DEC has a relatively low melting point of −43° C., that does not necessarily mean that an electrolyte prepared from DEC has high conductivity at low temperatures. S. T. Mayer, H. C. Yoon, C. Bragg, and J. H. Lee of PolyStor Corporation, presentation at *The Thirteenth International Seminar on Primary and Secondary Battery Technology and Application*, Mar. 4–7, 1996, Boca Raton, Fla. describe electrolytes consisting of 1.39M $LiPF_6$/EC:DEC=50:50 to 25:75 having freezing points higher than −15° C.

Therefore, in formulating a quaternary mixed solvent system for an electrolyte activating a lithium ion cell designed for low temperature applications wherein the electrolyte is at an equilibrium condition after preparation and will not undergo significant chemical composition variation during cell cycling, several factors are important. These include the oxidative stability of the constituent carbonate solvents, the chemical stability of the equilibrated solvent mixture, the passivation effect of the electrolyte towards a graphite electrode, the freezing point of the electrolyte and the increased low temperature conductivity of the electrolyte. For typically used high dielectric constant (cyclic carbonate) solvents, ethylene carbonate is better than vinylene carbonate. With low viscosity (linear carbonate) solvents, the smaller the molecular size, the lower the solvent viscosity within the same class of compounds. Thus, DMC is better than EMC, which is better than DEC.

Another factor that effects the cycleability of a lithium ion cell is the electrolyte stability toward the anode and the cathode. It is known that the chemical composition of the electrolyte initially filled into the casing to activate the cell can undergo chemical reaction during charge/discharge cycling, as reported by E. S. Takeuchi et al., *J. Electrochem. Soc.* 144, 1944–1948, 1997. This publication is incorporated herein by reference. The reaction is represented in the following equation:

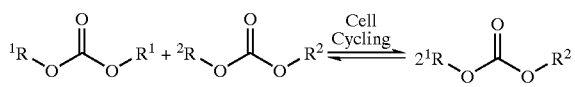

This phenomenon is largely avoided by starting with a carbonate solvent mixture that is already at an equilibration state. A method of preparing electrolytes of this type is fully described in U.S. Pat. Nos. 5,962,720 and 6,057,062, both to Gan et al., which are assigned to the assignee of the present invention and incorporated herein by reference.

According to the present invention, suitable nonaqueous electrolytes are comprised of an inorganic salt dissolved in a nonaqueous solvent and, more preferably, a lithium salt dissolved in a quaternary mixture of organic carbonate solvents. The solvents comprise dialkyl (non-cyclic) carbonates selected from dimethyl carbonate, diethyl carbonate, dipropyl carbonate (DPC), ethyl methyl carbonate, methyl propyl carbonate (MPC) and ethyl propyl carbonate (EPC), and mixtures thereof, and a cyclic carbonate selected from propylene carbonate (PC), ethylene carbonate, butylene carbonate (BC) and vinylene carbonate (VC), and mixtures thereof. However, in a broader sense, the quaternary mixture of organic carbonate solvents comprises one cyclic carbonate and three linear carbonates, wherein of the three linear carbonates, a first one has the formula $R^1OCOOR^1$, a second one has the formula $R^2OCOOR^2$ and a third one has the formula $R^1OCOOR^2$ with $R^1$ and $R^2$ being different and being saturated or unsaturated organic groups containing 1 to 13 carbon atoms.

In a preferred form of the present invention, the electrolyte activating the cell is essentially at equilibrium with respect to the molar ratio of DMC:EMC:DEC. This is important to maintain consistent and reliable cycling characteristics. It is known that due to the presence of low-potential (anode) materials in a charged cell, an un-equilibrated mixture of DMC:DEC in the presence of lithiated graphite ($LiC_6\sim0.01$ V vs $Li/Li^+$) results in a substantial amount of EMC being formed. E. S. Takeuchi et al., *J. Electrochem. Soc.* 144, 1944–1948, 1997 describe this phenomenon in the previously referenced publication.

In particular, the above-referenced Takeuchi et al. publication describes the construction of test cells having $LiCoO_2$ cathode material and petroleum coke anodes. Cycling of the cells with a 1.0 M $LiPF_6$/PC:DMC:DEC=2:1:1 electrolyte resulted in EMC formation. The product was observed even after only 1 charge cycle.

Takeuchi et al. then embarked on a study to determine the effect of the cell components on the ester exchange reaction that produces EMC from DMC and DEC. To that end a solution of a 1:1 molar ratio of DMC and DEC was used. As summarized in Table 2 below, none of the cell active components ($LiCoO_2$, petroleum coke, and $LiPF_6$) catalyzed the ester exchange reaction upon stirring at room temperature for several days. Also, no new product was observed even when a substantial amount of HF was added to the reaction mixture. These results show that the ester exchange reaction is not initiated or catalyzed by any of the individual cell components or an electrolyte acid impurity (HF). Similarly, additional tests indicated that the combination of all cell active components did not initiate the reaction. For example, when a fresh (uncharged) lithium-ion cell was stored with added electrolyte, the exchange reaction did not occur. Therefore, Takeuchi et al. concluded that the exchange reaction of DEC and DMC to produce EMC is independent of the individual cell components and is dependent on the cell reactions that correlate to the charged state of the cathode ($Li_{1-x}CoO_2$) and anode ($Li_xC_6$).

Takeuchi et al. then concluded that due to the presence of both high-potential (cathode) and low-potential (anode) materials in a charged test cell, it was impossible to distinguish which electrode is responsible for initiating the ester exchange reaction by just examining the products of the full lithium-ion cell. To distinguish between the oxidative and reductive pathways, charged electrode materials were added individually to solutions of a 1:1 molar ratio of DMC and DEC. After storage under stirring for several days at room temperature, the reaction mixture containing chemically produced cathode material ($Li_{0.5}CoO_2$, 4.28 V vs. $Li/Li^+$) presented no sign of EMC formation. However, the reaction mixture containing lithiated graphite ($LiC_6\sim0.01$ V vs. $Li/Li^+$) showed a substantial amount of EMC formation (Table 2). Since the reaction occurs heterogeneously on the carbon surface, quantitative analysis of the reaction kinetics was not determined due to the uncertainty of the active surface area of the catalyst. Qualitatively, the longer the storage time under stirring, the more EMC detected. These results demonstrate that the ester exchange reaction in lithium-ion cells is initiated at the anode (charged state). To confirm that the ester exchange reaction is catalyzed at a low potential, lithium metal was used in place of lithiated graphite. Similar results were obtained in that EMC was detected in the reaction mixture (Table 2).

TABLE 2

| Catalyst | EMC detection (m/o) |
| --- | --- |
| $LiCoO_2$ | None |
| Petroleum coke | None |
| $LiPF_6$ | None |
| HF | None |
| $Li_{0.5}CoO_2$ | None |
| $LiC_6$ | 39% |
| Lithium | 23% |
| $SmI_2$ | 50% |
| LiI | 0.02% |
| $Li_2Co_3$ | None |
| LiOH | 0.03% |
| $LiOCH_3$ | 50% |

From this it can be concluded that if an essentially equilibrated molar mixture of DMC, DEC and EMC is not provided in a new lithium ion secondary cell built in a discharged condition, as is typically the case, they will not readily equilibrate until the cell is charged and a lithiated carbonaceous material is formed at the negative electrode. As set forth in Table 2 above, lithiated carbon is a catalyst for the ester exchange reaction between DMC and DEC to form EMC. Also, the more charge/discharge cycles the cell undergoes, the more EMC produced until the carbonaceous negative electrode becomes passivated.

Thus, in formulating a quaternary mixed solvent system for an electrolyte activating a lithium ion cell according to the present invention, it is important that DMC, EMC and DEC are essentially at an equilibrium molar condition from the beginning so that the electrolyte does not undergo significant chemical decomposition during cell cycling.

The reason an equilibrated molar mixture of DEC, DMC and EMC is so important is that as the cell cycles between a discharged and a charged state, DMC and DEC undergo an ester exchange reaction to produce product EMC. Also, EMC disproportionates to DMC and DEC during cell cycling. If the ternary solvents of DMC:EMC:DEC are not filled into the cell in an essentially equilibrated molar mixture, cell performance changes as DMC and DEC react to form EMC, and EMC disproportionates to form DMC and DEC. In that light, a cell which is initially rated for discharge at, for example, $-20°$ C. would not be capable of such performance after several cycles as the molar ratio of EMC:DMC:DEC changes in an ester exchange reaction or a disproportionation reaction. Such unpredictability is not acceptable in a lithium ion cell.

Given a starting mixture of DEC and DMC, there are a fixed number of ethoxy and methoxy groups that will exchange under equilibrium conditions. The extent of exchange is determined by the relative energies of the reactants (DEC and DMC) and the product (EMC). In this case, the reactants and product are very similar structurally and energetically. Therefore, the equilibrium constant is consistent with a random distribution of ethoxy and methoxy groups in the reaction mixture. For example, in the case of a 50:50 mixture of DMC and DEC, there are an equal number of ethoxy and methoxy groups. This means there is a 25% chance of two ethoxy groups combining to give DEC, a 25% chance of two methoxy groups combining to give DMC, and a 50% chance of an ethoxy group and a methoxy group combining to give EMC at a relative concentration of DMC:DEC:EMC of 1:1:2. This means that a "k" constant for an essentially equilibrated molar mixture is calculated as $[EMC]^2/([DMC][DEC])$ or $4[2^2/(1\times1)]$. Since the equilibrium constant is independent of the initial concentrations of the reactants, this constant is valid for any starting mixture of DMC and DEC. In that respect, a suitable range for the k constant for an essentially equilibrated molar mixture of DMC, EMC and DEC according to the present invention is about 3.85 to about 4.15 or about $4.0\pm0.15$, more preferably about 3.95 to about 4.05, and most preferably about 4.0.

FIG. 1 is a graph showing various equilibrated molar mixtures of DMC:EMC:DEC based on a starting ratio of DMC:DEC. For example, reading from left to right on the x-axis or abscissa of FIG. 1, if the beginning DMC % (molar) in an initial DMC:DEC mixture is about 25.0% DMC, the exemplary starting mixture of DMC:DEC begins as about 25.0% DMC:75.0% DEC. A line is then drawn from this point parallel to the y-axis, intersecting curves 10, 12 and 14 for the respective molar percentages in the equilibrated mixture of DMC, EMC and DEC. This starting mixture equilibrates to a molar mixture (read on the y-axis or ordinate) of about 6.2% DMC, 37.5% EMC and 56.3% DEC. This equilibrated mixture no. 1 and those of two other exemplary mixtures from the graph of FIG. 1 are set forth in Table 3 below.

TABLE 3

| Mixture No. | DMC % (molar) in initial DMC:DEC Mixture | Resulting Equilibrated Mixture of DMC: EMC: DEC |
| --- | --- | --- |
| 1 | 25:75 | 6.2:37.5:56.3 |
| 2 | 50:50 | 25:50:25 |
| 3 | 75:25 | 56.3:37.5:6.2 |

After the constituents EMC, DMC and DEC are provided in the electrolyte in an essentially equilibrated molar mixture, ethylene carbonate is added to tailor the cell to a particular application.

Preferred molar percentages for the various carbonate solvents include EC in the range of about 10% to about 50%; DMC in the range of about 5% to about 75%; EMC in the range of about 5% to about 50%; and DEC in the range of about 3% to about 45%. Electrolytes containing this quaternary carbonate mixture exhibit freezing points below $-50°$ C., and lithium ion cells activated with such mixtures have very good cycling behavior at room temperature as well as very good discharge and charge/discharge cycling behavior at temperatures below $-20°$ C.

Known lithium salts that are useful as a vehicle for transport of alkali metal ions from the anode to the cathode, and back again, include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiNO_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof. Suitable salt concentrations typically range between about 0.8 to 1.5 molar.

The assembly of the cell described herein is preferably in the form of a wound element cell. That is, the fabricated cathode, anode and separator are wound together in a "jellyroll" type configuration or "wound element cell stack" such that the anode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium or aluminum, but not limited thereto, so long as the metallic material is compatible for use with components of the cell.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin feedthrough preferably comprises molybdenum although titanium, aluminum, nickel alloy, or stainless steel can also be used. The cell header comprises elements having compatibility with the other components of the electrochemical cell and is resistant to corrosion. The cathode lead is welded to the positive terminal pin in the glass-to-metal seal and the header is welded to the case containing the electrode stack. The cell is thereafter filled with the electrolyte solution described hereinabove, and hermetically sealed such as by close-welding a stainless steel ball over the fill hole, but not limited thereto. This above assembly describes a case-negative cell, which is the preferred construction for the exemplary secondary cell of the present invention. As is well known to those skilled in the art, the electrochemical system of the present invention can also be constructed in a case-positive configuration.

The following examples describe the manner and process of an electrochemical cell according to the present invention, and they set forth the best mode contemplated by the inventors of carrying out the invention, but they are not to be construed as limiting.

EXAMPLE I

Carbonate Solvent Mixture Preparation

1. Mixture 1 Synthesis

A 2:1 molar ratio (molar ratio of 58:42) of DMC (116 ml) and DEC (84 ml) was mixed in a 500 ml flask. A catalyst of 0.1 g $LiOCH_3$ was added to the mixture that was then refluxed for 12 hours. Gas chromatography (GC) analysis indicated that the reaction mixture reached equilibration with a DMC:EMC:DEC molar ratio of 40:45:15. The reaction mixture was then filtered through 47 mm of a Glass Fiber Filter, Type A/E (from Gelman Science). Clear solution (Mixture 1) was obtained.

2. Mixture 2 Synthesis

A 1:1 molar ratio (molar ratio 41:59) of DMC (82 ml) and DEC (118 ml) was mixed in a 500 ml flask. A catalyst of 0.1 g $LiOCH_3$ was added to the mixture, which was then refluxed for 12 hours. Gas chromatography (GC) analysis indicated that the reaction mixture reached equilibration with a DMC:EMC:DEC molar ratio of 20:50:30. The reaction mixture was then filtered through 47 mm of a Glass Fiber Filter, Type A/E (from Gelman Science). Clear solution (Mixture 2) was obtained.

The above examples demonstrate a synthetic method. The final molar ratio of the equilibrated solvent mixture can be adjusted by varying the ratio of the initial solvent constituents. For example, the ratio of EMC in the final reaction mixture can range from about 41% to about 48% for starting ratios of DMC:DEC of about 4:2 to 2:4, respectively. As is apparent to those skilled in the art, the solvent mixtures can also be prepared by mixing the appropriate amount of pure DMC, EMC and DEC.

EXAMPLE II

Electrolyte Preparation and Their Properties

Eight new electrolytes were prepared by mixing EC with Mixture 1 or Mixture 2 in the molar ratio of 2:8, 3:7, 4:6, and 5:5. A conventional electrolyte was also prepared for comparison, as summarized in Table 4.

TABLE 4

| Electrolyte | [$LiAsF_6$] M | [$LiPF_6$] M | Solvent Vol. Ratio EC:DMC:EMC:DEC |
|---|---|---|---|
| 1 | 1.0 | | 20:32:36:12 |
| 2 | 1.0 | | 30:28:32:10 |
| 3 | 1.0 | | 40:24:27:9 |
| 4 | 1.0 | | 50:20:23:7 |
| 5 | 1.0 | | 20:16:40:24 |
| 6 | 1.0 | | 30:14:35:21 |
| 7 | 1.0 | | 40:12:30:18 |
| 8 | 1.0 | | 50:10:25:15 |
| 9 | | 1.0 | 30:70 |

The conductivity of these electrolytes was recorded at temperatures ranging from −20° C. to 50° C. with a YSI Model 32 Conductivity Meter. The results are summarized in Table 5.

TABLE 5

Electrolyte Conductivity (mS)

| Elec. | −20° C. | −10° C. | 0° C. | 10° C. | 20° C. | 30° C. | 40° C. | 50° C. |
|---|---|---|---|---|---|---|---|---|
| 1 | 3.04 | 4.22 | 5.59 | 6.95 | 8.59 | 10.01 | 11.80 | 13.35 |
| 2 | 2.71 | 4.13 | 5.64 | 7.06 | 8.91 | 10.72 | 12.38 | 14.07 |
| 3 | 2.71 | 3.93 | 5.40 | 7.20 | 8.96 | 10.87 | 12.80 | 14.76 |
| 4 | 2.32 | 3.51 | 4.98 | 6.73 | 8.55 | 10.65 | 12.75 | 14.89 |
| 5 | 2.73 | 3.70 | 4.94 | 6.55 | 7.98 | 9.45 | 10.87 | 12.25 |
| 6 | 2.73 | 3.81 | 5.13 | 6.60 | 8.33 | 10.12 | 11.82 | 13.62 |
| 7 | 2.45 | 3.68 | 5.06 | 6.73 | 8.45 | 10.25 | 12.00 | 13.93 |
| 8 | Freeze | 3.48 | 4.77 | 6.35 | 8.23 | 10.18 | 12.19 | 14.23 |
| 9 | Freeze | 5.19 | 6.90 | 8.79 | 10.74 | 12.72 | 14.62 | 16.48 |

The above results show that the conventional electrolyte 9 presented higher conductivities than that of the new formulated electrolytes at all temperatures, except at −20° C. At −20° C., electrolyte 9 froze, which makes it unusable. Unexpectedly, electrolyte 8 also froze at −20° C., however, electrolyte 4 which contained 50%, by mole, EC, as did electrolyte 8, did not freeze at the same temperature. Comparing these two electrolytes, electrolyte 4 contained more DMC (MP of 3° C.) and less DEC (MP of −43° C.) than that of electrolyte 8. This demonstrates that the electrolyte freezing point of a quaternary carbonate is not directly proportional to the percentage of the lowest melting point solvent component. The conductivity results also indicate that at low temperatures, electrolyte conductivity is inversely proportional to the EC percentage. In other words, the lower the EC percentage, the higher the conductivity of the electrolyte. Additionally, in comparing electrolytes having similar percentages of EC, electrolyte conductivity is proportional to the DMC concentration (electrolytes 1 vs. 5; 2 vs. 6; 3 vs. 7; 4 vs. 8). This is consistent with the consideration that the smaller the linear carbonate molecular size, the lower the solvent viscosity and the higher the electrolyte conductivity.

The freezing points of the above electrolytes 1 to 9 were also investigated and summarized in Table 6.

TABLE 6

Electrolyte Freezing Point Evaluation

| Electrolyte | Freezing Point |
|---|---|
| 1 | −55° C. < −50° C. |
| 2 | −60° C. < −55° C. |
| 3 | <−32° C. |
| 4 | −25° C. |
| 5 | −75° C. < −60° C. |
| 6 | −75° C. < −60° C. |
| 7 | <−32° C. |
| 8 | −15° C. |
| 9 | −11° C. |

The above test results demonstrate that electrolytes 8 and 9 cannot be used in lithium ion cells for low temperature (<−150° C.) applications. All of the other electrolytes can be used in lithium ion cells at or below −200° C.

EXAMPLE III

Lithium Ion Cell Preparation and Electrochemical Testing

1. Cell Preparation

The cathode was prepared by casting a $LiCoO_2$ cathode mixture on aluminum foil. The cathode mix contained 91% $LiCoO_2$, 6% graphite additive and 3% PVDF binder. The anode was prepared similarly by casting an anode mixture containing 91.7% graphite and 8.3% PVDF binder on a copper foil. An electrode assembly was obtained by placing one layer of polyethylene separator between the cathode and the anode and the assembly was spirally wounded into a jellyroll configuration and housed inside of an AA sized cylindrical stainless steel casing. Various groups of AA cells were obtained by activating the electrode assemblies with six different electrolytes, as shown in Table 7.

TABLE 7

| Group | Electrolyte (#) | # of cells |
|---|---|---|
| 1 | 1.0 M LiPF$_6$/EC:DMC = 30:70 (#9) | 5 |
| 2 | 1.0 M LiAsF$_6$/EC:DMC = 30:70 | 5 |
| 3 | 1.0 M LiAsF$_6$/EC:DMC:EMC:DEC = 20:16:40:24 (#5) | 5 |
| 4 | 1.0 M LiAsF$_6$/EC:DMC:EMC:DEC = 30:14:35:21 (#6) | 4 |
| 5 | 1.0 M LiAsF$_6$/EC:DMC:EMC:DEC = 20:32:36:12 (#1) | 4 |
| 6 | 1.0 M LiAsF$_6$/EC:DMC:EMC:DEC = 30:28:32:10 (#2) | 5 |

2. Room Temperature Cycling Test

The thusly-fabricated cells were charge/discharge cycled between 4.1V and 2.75V under a 0.14C discharge rate (1C rate=520 mA) at room temperature. The cells were charged under a 0.14C rate to 4.1V and then the were held at that voltage until the current dropped to 10% of the original current. The cycling results of each group of cells are summarized in Table 8.

TABLE 8

| | Discharge Capacity (mAh) | | | Capacity Retention (%) at 50th Cycle | |
|---|---|---|---|---|---|
| Group* | Cycle 1 | Cycle 10 | Cycle 50 | vs. Cycle 1 | vs. Cycle 10 |
| 1 | 545 | 510 | 461 | 84.6 | 90.4 |
| 2 | 530 | 505 | 461 | 87.0 | 91.3 |
| 3 | 525 | 507 | 464 | 88.4 | 91.5 |
| 4 | 525 | 498 | 462 | 88.0 | 92.8 |
| 5 | 520 | 492 | 453 | 87.1 | 92.1 |
| 6 | 538 | 512 | 478 | 88.8 | 93.4 |

*Data for groups 1, 2, 3 and 6 are the average of 5 cells. Data for groups 4 and 5 are the average of 4 cells.

As set forth in Table 8, all six groups of cells exhibited similar cycling characteristics. In particular, the groups 3 to 6 cells activated with an electrolyte comprising a quaternary mixture of nonaqueous organic carbonate solvents according to the present invention presented similar cycling performance as that of the groups 1 and 2 cells with conventional binary solvent electrolytes.

3. Discharge Rate Capability at Various Temperatures

After the cycling test, the AA cells were charged at room temperature, then they were discharged under various C-rates at room temperature, 0° C., -20° C. and -40° C. Three cells were used in each of the tests except for the room temperature test, which used five cells. Assuming a room temperature discharge rate capacity of 0.14C as a 100% standard, the relative discharge efficiencies of all the other discharge conditions were calculated. The results are shown in FIGS. 2 to 5 and summarized in Tables 9 to 12, respectively.

TABLE 9

Discharge Rate Efficiency at Room Temperature (%)*

| Group | 2.23 C | 1.12 C | 0.56 C | 0.28 C | 0.14 C | 0.07 C | 0.03 C |
|---|---|---|---|---|---|---|---|
| 1 | 32.7 | 82.4 | 95.5 | 98.8 | 100.0 | — | — |
| 2 | 39.4 | 86.3 | 95.5 | 98.7 | 100.0 | — | — |
| 3 | 20.4 | 69.0 | 93.6 | 98.1 | 100.0 | — | — |
| 4 | 24.3 | 73.3 | 94.7 | 98.6 | 100.0 | — | — |
| 5 | 28.5 | 78.7 | 94.5 | 98.3 | 100.0 | — | — |
| 6 | 30.4 | 84.7 | 96.3 | 98.9 | 100.0 | — | — |

*Average data of 5 cells. 1 C rate = 520 mA discharge rate

TABLE 10

Discharge Rate Efficiency at 0° C. (%)*

| Group | 2.23 C | 1.12 C | 0.56 C | 0.28 C | 0.14 C | 0.07 C | 0.03 C |
|---|---|---|---|---|---|---|---|
| 1 | — | 55.6 | 84.8 | 91.0 | 93.2 | 94.5 | — |
| 2 | — | 54.5 | 81.9 | 89.6 | 92.8 | 94.5 | — |
| 3 | — | 34.7 | 75.8 | 89.7 | 93.8 | 95.5 | — |
| 4 | — | 38.8 | 75.4 | 89.0 | 93.2 | 95.0 | — |
| 5 | — | 43.4 | 80.9 | 90.0 | 93.3 | 94.8 | — |
| 6 | — | 46.8 | 84.5 | 91.8 | 94.3 | 95.4 | — |

*Average data of 3 cells. 1 C rate = 520 mA discharge rate.

TABLE 11

Discharge Rate Efficiency at -20° C. (%)*

| Group | 2.23 C | 1.12 C | 0.56 C | 0.28 C | 0.14 C | 0.07 C | 0.03 C |
|---|---|---|---|---|---|---|---|
| 1 | — | — | 4.6 | 6.0 | 6.7 | 7.4 | 8.5 |
| 2 | — | — | 3.6 | 4.9 | 5.7 | 6.4 | 7.7 |
| 3 | — | — | 9.2 | 66.0 | 85.3 | 91.2 | 94.7 |
| 4 | — | — | 12.0 | 61.7 | 79.7 | 87.8 | 92.8 |
| 5 | — | — | 25.2 | 72.8 | 86.5 | 91.0 | 93.7 |
| 6 | — | — | 26.2 | 71.5 | 85.5 | 90.5 | 93.7 |

*Average data of 3 cells. 1 C rate = 520 mA discharge rate.

TABLE 12

Discharge Rate Efficiency at -40° C. (%)*

| Group | 2.23 C | 1.12 C | 0.56 C | 0.28 C | 0.14 C | 0.07 C | 0.03 C |
|---|---|---|---|---|---|---|---|
| 1 | — | — | 0.0 | 0.0 | 0.0 | 0.0 | 0 |
| 2 | — | — | 0.0 | 0.0 | 0.0 | 0.0 | 0 |
| 3 | — | — | 0.0 | 0.1 | 2.7 | 29.7 | 72 |
| 4 | — | — | 0.0 | 0.0 | 0.0 | 0.1 | 7.5 |
| 5 | — | — | 0.0 | 0.2 | 6.2 | 49.5 | 80.6 |
| 6 | — | — | 0.0 | 0.0 | 0.0 | 3.1 | 71.5 |

*Average data of 3 cells. 1 C rate = 520 mA discharge rate.

Figure 2:
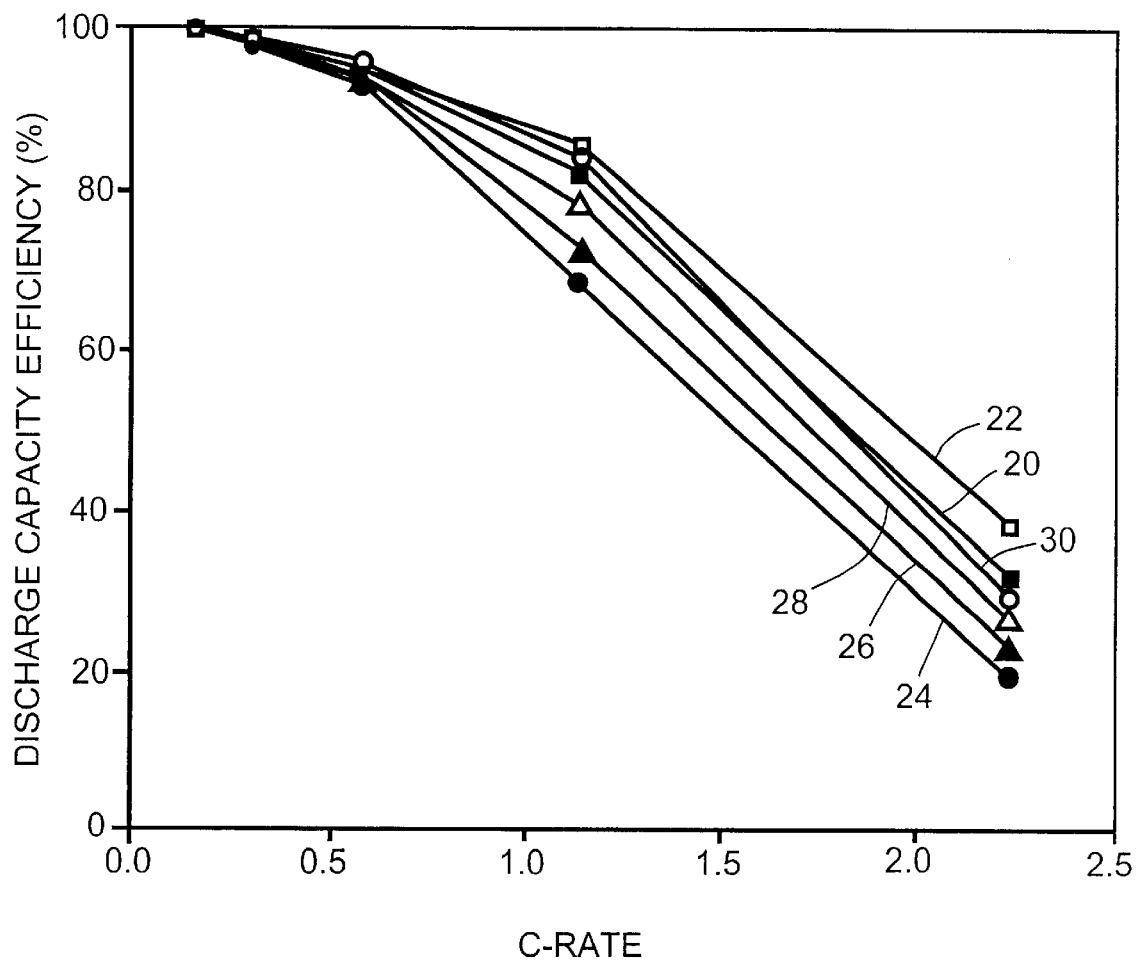
FIGS. 2 to 5 are graphs constructed from the average discharge rate efficiency of various rechargeable cells according to the prior art and the present invention discharged at room temperature, 0° C., −20° C. and −40° C.

In FIG. 2, respective curves 20, 22, 24, 26, 28 and 30 were constructed from the average discharge rate efficiency of the groups 1 to 6 cells at room temperature. FIG. 2 demonstrates that the groups 1 and 2 prior art cells activated with binary solvent electrolytes afforded better discharge rate capability than that of the groups 3 to 6 present invention cells at room temperature under discharge rates greater than >0.5C. At discharge rates lower than 0.5C, all groups of cells presented similar discharge efficiency.

Figure 3:
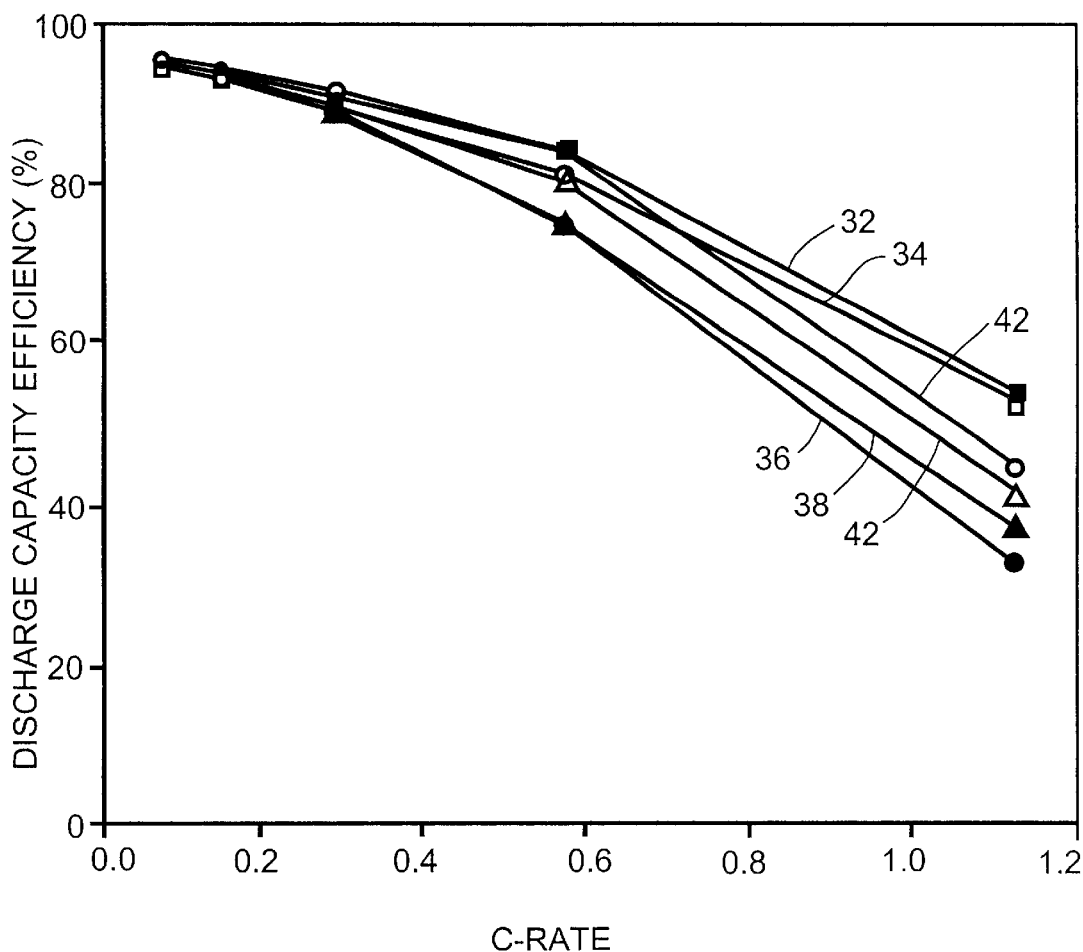

In FIG. 3, respective curves 32, 34, 36, 38, 40 and 42 were constructed from the average discharge rate efficiency of the groups 1 to 6 cells at 0° C. FIG. 3 demonstrates that the groups 1 and 2 prior art cells activated with binary solvent electrolytes still afforded better discharge rate capability than that of the groups 3 to 6 present invention cells at 0° C. under a discharge rate greater than >0.5C. At a discharge rate lower than 0.5C, all groups of cells presented similar discharge efficiency.

Figure 4:
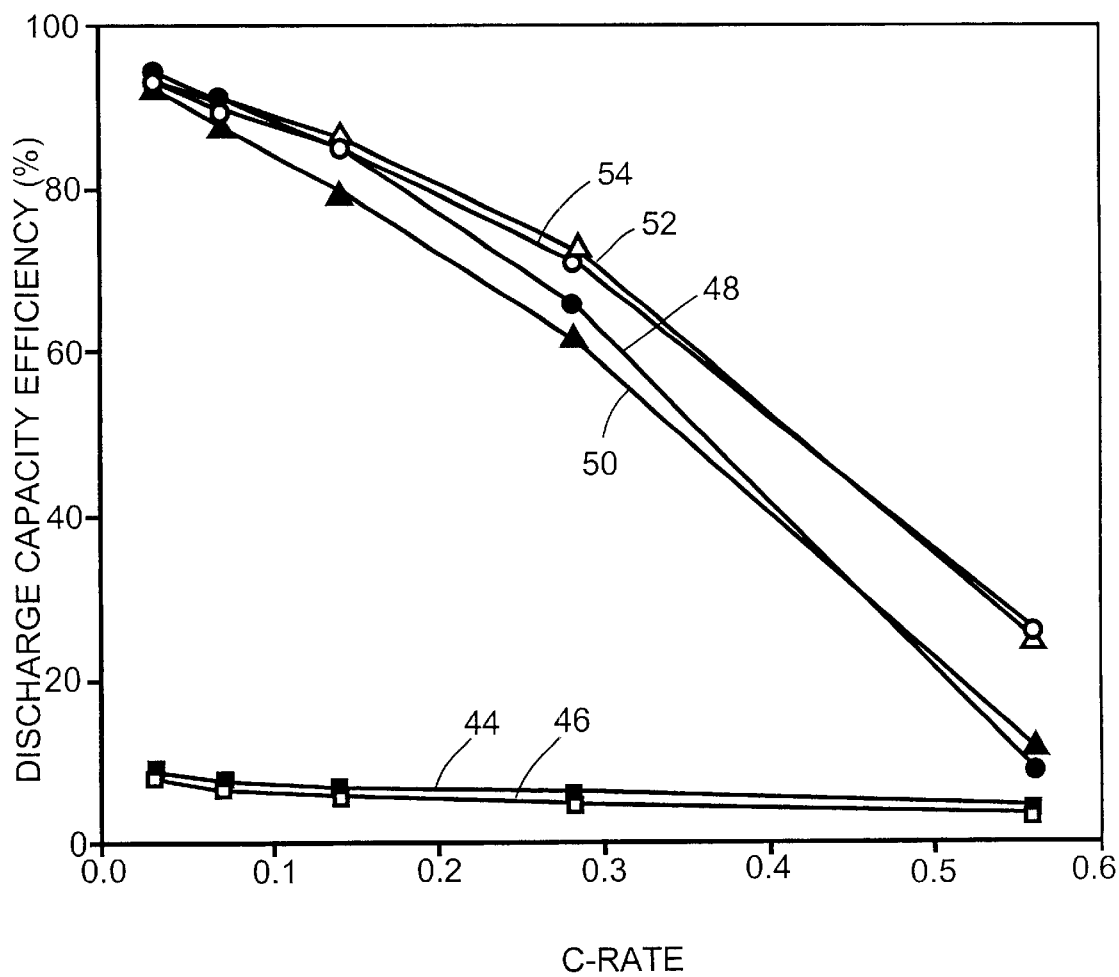

In FIG. 4, respective curves 44, 46, 48, 50, 52 and 54 were constructed from the average discharge rate efficiency of the groups 1 to 6 cells at −20° C. FIG. 4 demonstrates that at −20° C., the groups 1 and 2 prior art cells activated with the binary solvent electrolytes afforded no realistic discharge capacity. This is consistent with the observation that electrolyte 9 freezes at −11° C. In contrast, the groups 3 to 6 cells activated with a quaternary mixture of nonaqueous organic carbonate solvents according to the present invention delivered good discharge efficiencies under all rates tested. The results also demonstrate that the groups 5 and 6 cells activated with the present invention electrolytes 1 and 2 appear to have higher discharge rate capability than that of the groups 3 and 4 cells activated with present invention electrolytes 5 and 6.

Figure 5:
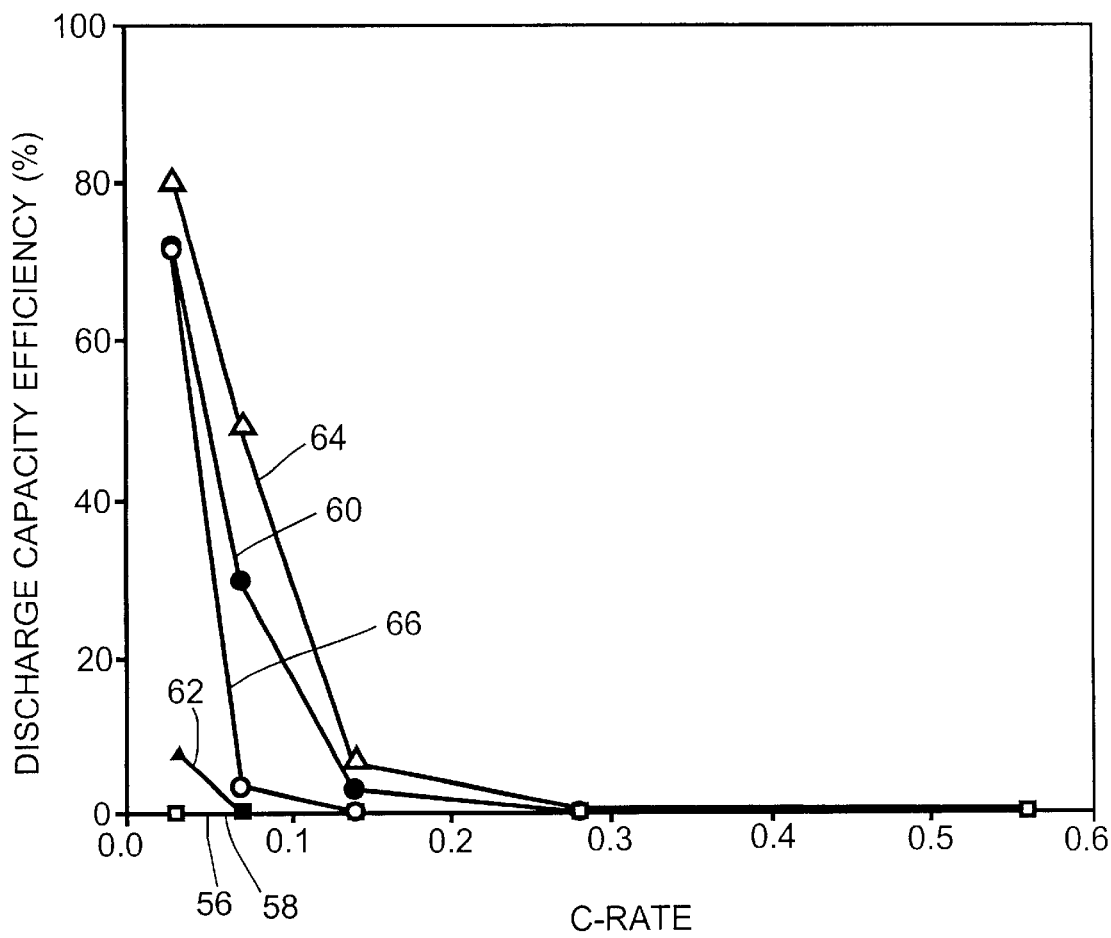

In FIG. 5, respective curves 56, 58, 60, 62, 64 and 66 were constructed from the average discharge rate efficiency of the groups 1 to 6 cells at −40° C. At that temperature, none of the cells from groups 1 to 6 was capable of delivering any appreciable capacity above the 0.1C discharge rate. Under a lower discharge rate, the groups 1 and 2 prior art cells still were not capable of delivering any appreciable capacity. In contrast, the groups 3, 5 and 6 present invention cells presented fairly high discharge efficiencies.

The test results in this example clearly demonstrate the effect of electrolyte chemistry has on lithium ion cell discharge efficiency at low temperatures. Cells activated with electrolytes comprising a quaternary mixture of nonaqueous organic carbonate solvents according to the present invention gave comparable discharge capacity at room temperature and 0° C. with respect to cells of a similar electrode chemistry activated with prior art electrolytes. In addition, they provide superior discharge rate capability over the cells with the conventional binary solvent electrolytes at or below −20° C. At or below −20° C., the groups 1 and 2 prior art cells cannot be discharged.

EXAMPLE IV

Charge/Discharge Cycling at Low Temperatures

After low temperature discharge rate capability tests, the cells constructed in Example III were cycle tested at 0° C. and −20° C. under a discharge rate of 0.14C. Since the groups 1 and 2 prior art cells are known to be incapable of discharging at −20° C., they were only tested at room temperature and at 0° C. All other groups of cells were tested at room temperature, 0° C and −20° C.

The groups 1 and 2 prior art cells were first cycled three times at room temperature. Then, they were equilibrated at 0° C. for 24 hours before cycling for another three times. Finally, they were cycled three more times at room temperature. For the groups 3 to 6 present invention cells, similar procedures were used except that before the 0° C. test, the cells were tested at −20° C.

Figure 6:
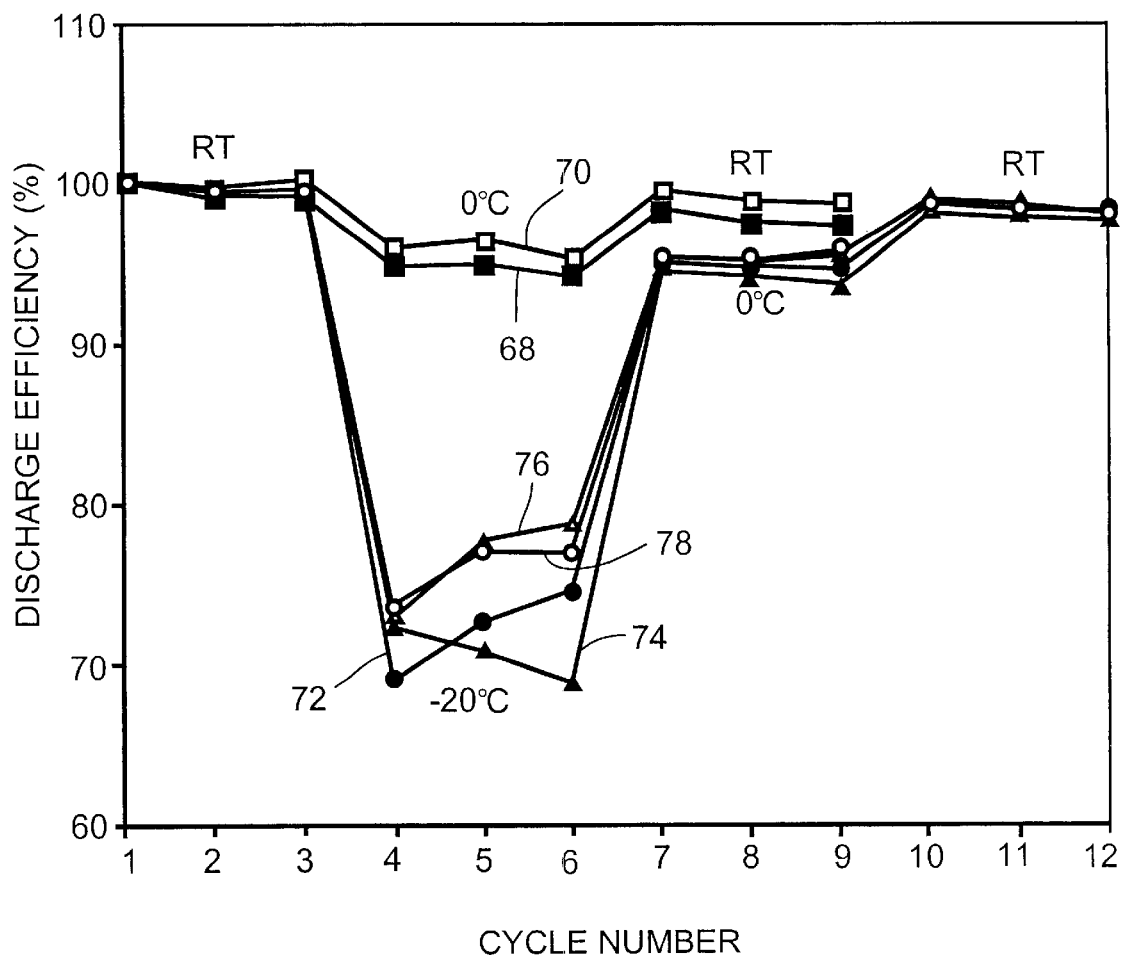
FIG. 6 is a graph constructed from the average discharge efficiency of the cells discharged in FIGS. 2 to 5 cycled at various temperatures.

Assuming a room temperature first discharge cycle capacity as a 100% standard, the efficiencies of all other cycles were calculated. The results are summarized in FIG. 6, wherein respective curves 68, 70, 72, 74, 76 and 78 were constructed from the average discharge efficiency of the group 1 to 6 cells. For all groups of cells, about 95% of room temperature discharge capacity was realized at 0° C. cycling. For the groups 3 and 4 cells, about 70% of room temperature discharge capacity was realized at −20° C. cycling. For the groups 5 and 6 cells, about 75% of room temperature discharge capacity was realized at −200° C. The results illustrate that lithium ion cells activated with an electrolyte comprising a quaternary mixture of nonaqueous organic carbonate solvents according to the present invention are capable of being charge/discharge cycled at low temperature with good capacity efficiency.

EXAMPLE V

Self-Discharge and the Rate of Capacity Recovery

After the room temperature discharge rate capability test described in Example III, section 3, two cells from each of groups 1, 2, 3 and 6 and one cell from groups 4 and 5 were placed on self-discharge test. The cells were cycled between 4.1V and 2.75V once under a 0.14C discharge rate (defined as a first cycle), followed by charging them to the fully charged state (defined as a second cycle-charging). Then, the cells were stored on open circuit at room temperature for 30 days, followed by discharging (defined as a second cycle after storage-discharging). The cells were then cycled once more (defined as a third cycle). The self-discharge rate was calculated from the ratio of the capacity difference between the first cycle discharge and the second cycle after storage-discharge over the first cycle discharge capacity. The rate of capacity recovery was calculated from the ratio of the third cycle discharge capacity divided by the first cycle discharge capacity. The results are summarized in Table 13.

TABLE 13

Self-Discharge and Recovery Rate of Capacity

| Group | Self-Discharge (%) | Capacity Recovery (%) |
|---|---|---|
| 1* | 18.8 | 86.7 |
| 2* | 13.8 | 91.0 |
| 3* | 13.0 | 90.3 |
| 4 | 14.2 | 88.9 |
| 5 | 19.1 | 82.3 |
| 6* | 13.1 | 90.3 |

*Average data of two cells.

The data in Table 13 indicates that other than the group 5 cells, which exhibited a self-discharge rate similar to that of the group 1 prior art cells, all of the other groups of cells exhibited a lower self-discharge rate than that of the group 1 cells. The same trend was also observed for the capacity recovery rate. This example demonstrates that lithium ion cells activated with an electrolyte comprising a quaternary mixture of nonaqueous organic carbonate solvents according to the present invention present similar or lower self-discharge rates relative to that of cells activated with a binary solvent electrolyte according to the prior art. The capacity recovery rate after self-discharge test is also comparable among all groups of cells.

EXAMPLE VI

Two lithium ion cells were constructed having a cathode and an anode prepared as described in Example III. The electrode assembly for each cell was spirally wound into a jellyroll configuration and housed inside a prismatic stainless steel casing. Prismatic lithium ion cells with initial capacity of 1.5 Ah were obtained by activating the electrode assemblies with an electrolyte of 1.4M $LiPF_6$/EC:DMC:EMC:DEC=20:40:30.4:9.6, by mole.

Test 1

Figure 7:
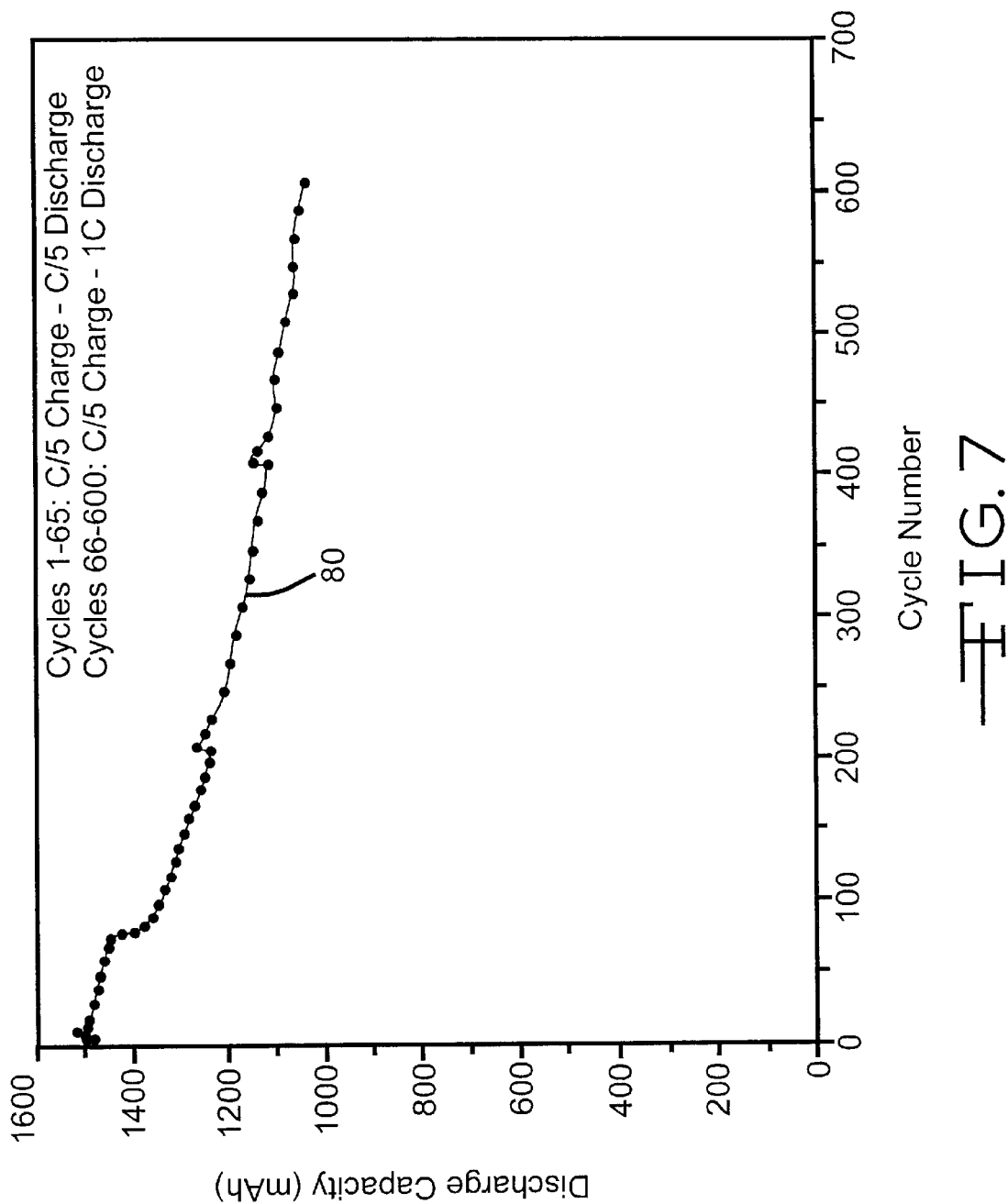
FIG. 7 is a graph constructed from a lithium ion cell according to the present invention cycled at room temperature.

One of the lithium ion cells was charge-discharge cycled at room temperature. For all cycles, the cell was charged under a 300 mA current to 4.1V until the current dropped to 60 mA. After one-hour rest at open circuit, the cell was discharged under either a 300 mA current (cycles 1 to 65) or 1.5 Amp current (cycles 66 to 600) to 2.75V. After discharge, the cell was rested on open circuit for one hour before the next cycle. The cycling results are illustrated in FIG. 7, curve 80. The results indicate that lithium ion cells activated with the quaternary solvent electrolyte of the present invention cycled well at room temperature. About 70% of the initial capacity (the very first cycle) was maintained after 600 cycles under a 1C discharge rate.

Test 2

Figure 8:
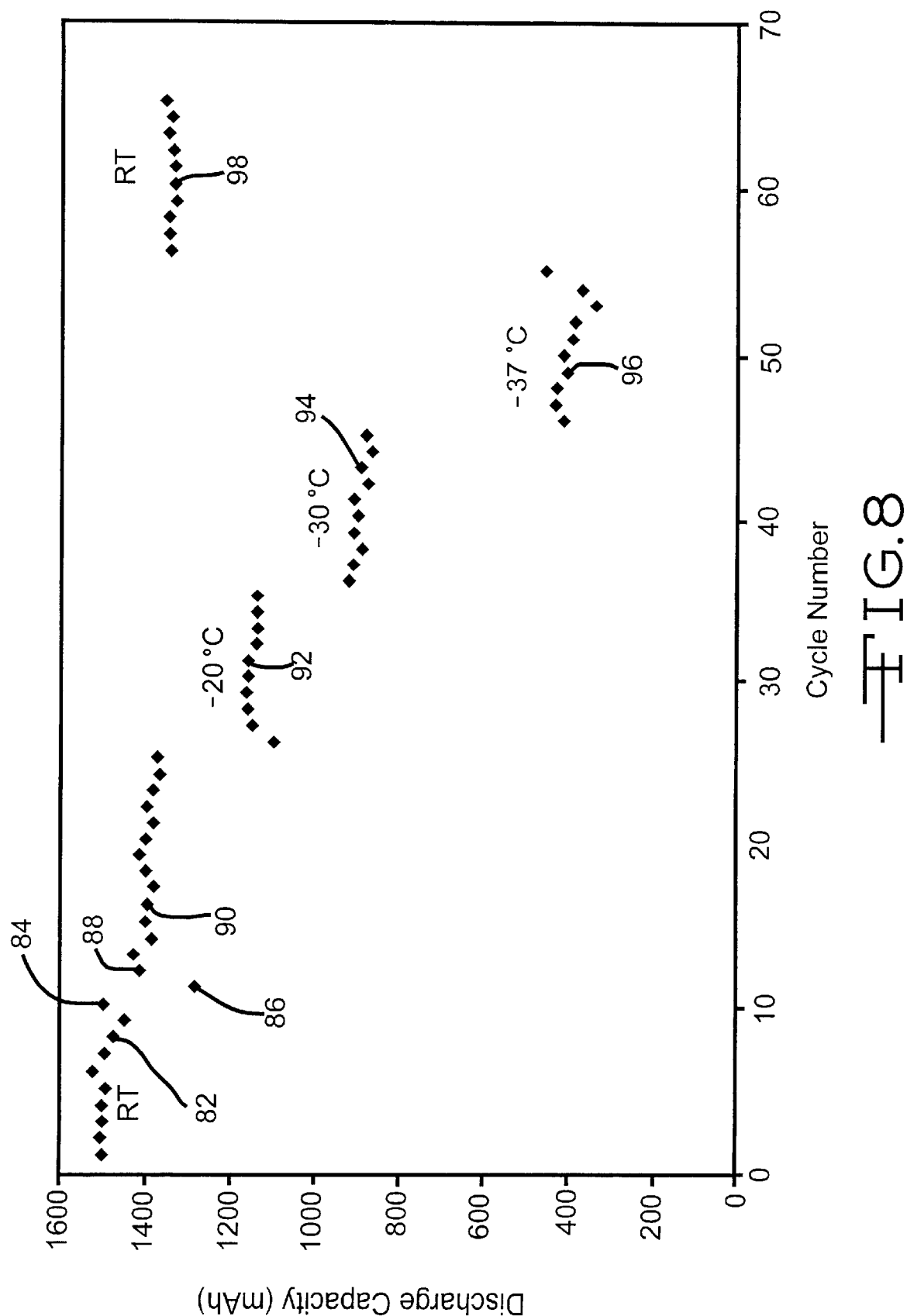
FIG. 8 is a graph constructed from the cycle results of a lithium ion cell according to the present invention discharged at various temperatures and under various rates.

The other of the lithium ion cells built for this example was cycled under various conditions. The charging conditions were the same as those described in Test 1. However, the discharge conditions varied as follows:

a) Formation Cycling: For cycles 1 to 5, the cell was discharged under a 300 mA current to 2.75V. A one hour rest period was provided between charging and discharging.

b) Discharge Rate Capability Test: For cycles 6 to 9, the cell's discharge rate capabilities were tested by discharging the cell under a 300 mA current (0.2C rate), a 0.75 mA current (0.5C rate), a 1.5 Amp current (1.0C rate), and a 3.0 Amp current (2.0C rate). The results of this test are summarized in Table 14 and illustrated in FIG. 8. In FIG. 8, curve 82 is the results of cycles 1 to 9. The discharge capability was calculated based on the 0.2C rate as 100% efficiency. The data in Table 14 indicate that the cell with the quaternary solvent electrolyte can be discharged under as high a rate as 2C with more than 96% efficiency.

TABLE 14

Discharge Rate Capability Test 1.4 M LiPF$_6$/EC:DMC:EMC:DEC = 20:40:30.4:9.6 Discharge Efficiency (% of 0.2 C Rate Discharge)

| 0.2 C | 0.5 C | 1 C | 2 C |
|---|---|---|---|
| 100 | 98.6 | 97.7 | 96.4 | c) Self-Discharge/Capacity Retention Test: For cycles 10 to 12, a self-discharge/capacity retention test was carried out on the lithium ion cell. Cycle 10 (data point 84 in FIG. 8) was a normal C/5 charge and C/5 discharge cycle. In cycle 11 (data point 86 in FIG. 8), the cell was fully charged and stored on open circuit for 33 days. Then, it was discharge under a 300 mA current to 2.75V. Cycle 12 (data point 88 in FIG. 8) was performed the same as cycle 10. The self-discharge rate was calculated based on the discharge capacity ratio of cycle 11 over cycle 10. The results are listed in Table 15. The results indicate that only about 5.5% of capacity was permanently lost after 33 days of open circuit storage at room temperature under a fully charged state.

TABLE 15

Self-Discharge/Capacity Retention Test 1.4 M LiPF$_6$/EC:DMC:EMC:DEC = 20:40:30.4:9.6

| Self-Discharge (%) | Capacity Retention (%) |
|---|---|
| 14.4 | 94.5 | d) Low Temperature Discharge Capability Test:

For cycles 13 to 25 (curve 90 in FIG. 8), after charging, the lithium ion cell was thermally equilibrated at temperatures ranging from room temperature (RT) to −50° C. for 24 hours. Then, the cell was discharged at the designated temperature under various discharge currents until a 2.0V cut off (2.75V for RT test). The cell was further discharged to a 2.75V cut off after being warmed to room temperature for more than four hours. The discharge efficiencies under various conditions were calculated based on the ratio of discharge capacity at the assigned temperature and discharge rate over that of the total capacity of that particular cycle. The results are summarized in Table 16 and FIG. 8. The data shows that a lithium ion cell activated with the equilibrated quaternary solvent electrolyte of the present invention can be discharged at temperatures as low as −500° C. under a fairly high discharge rate. High discharge efficiencies were observed.

TABLE 16

Low Temperature Discharge Efficiency 1.4 M LiPF$_6$/EC:DMC:EMC:DEC = 20:40:30.4:9.6

| Temperature (° C.) | Discharge Rate (C) | Efficiency (% of RT) |
|---|---|---|
| At RT | 0.2 C | 100.0 |
| At −20° C. | 0.1 C | 95.2 |
| | 0.2 C | 95.2 |
| | 0.4 C | 93.9 |
| | 0.8 C | 92.6 |
| | 1.0 C | 92.0 |
| At −30° C. | 0.1 C | 94.0 |
| | 0.2 C | 92.9 |
| | 0.4 C | 92.4 |
| At −40° C. | 0.1 C | 91.2 |
| | 0.2 C | 86.0 |
| | 0.4 C | 83.4 |
| At −50° C. | 0.1 C | 62.9 | e) Low Temperature Cycling Test: For cycles 26 to 65, the lithium ion cell was cycled at various temperatures. However, in this test, the cell was not only discharged at the designated temperatures, it was also charged at the same temperature. In all cycles, the cell was charged under 150 mA current (0.1C rate) to 4.1V, followed by charging the cell at 4.1V until the current dropped to 50 mA. After one hour resting on open circuit, the cell was discharged under a 300 mA current (0.2C rate) until it reached 2.0V. This occurred at the following respective temperatures: −20° C., −300° C., −370° C., or 2.75V (at RT). The beginning of the next cycle did not occur until after a one-hour rest. Ten cycles were obtained respectively at −200° C., −300° C., −370° C. and room temperature. The results are summarized in FIG. 8, wherein curve 92 is the results of cycling at −200° C., 94 is the results of the cycling at −300° C., curve 96 is the results of the cycling at −370° C. and curve 98 is the results of the cycling at room temperature. The results indicate that a lithium ion cell activated with the quaternary solvent electrolyte of the present invention not only is capable of efficient discharged at temperatures as low as −500° C., it is also capable of being charge and discharge cycled at low temperatures (as low as −370° C. tested).

From the above examples, it is clearly demonstrated that lithium ion cells activated with electrolytes comprising a quaternary mixture of EC, DMC, DEC and EMC according to the present invention exhibit similar cycling behavior and superior low temperature charge/discharge capability relative to cells of a similar electrode chemistry activated with conventional solvent system electrolytes.

It is appreciated that various modifications to the present inventive concepts described herein may be apparent to those of ordinary skill in the art without departing from the spirit and scope of the present invention as defined by the herein appended claims.

What is claimed is:

1. An electrochemical cell, which comprises:
    a) a negative electrode of a negative electrode active material which intercalates and deintercalates with an alkali metal;
    b) a positive electrode comprising an alkali metal intercalated electrode active material which intercalates and deintercalates with the alkali metal;
    c) an electrolyte solution activating the negative and positive electrodes, the electrolyte (including an alkali metal salt dissolved in a mixture comprising dimethyl carbonate (DMC), ethyl methyl carbonate (EMC) and diethyl carbonate (DEC), wherein from a beginning molar mixture of DMC and DEC solvents in a ratio of a% of DMC and 1−a% of DEC and with the negative electrode deintercalated with the alkali metal and the positive electrode intercalated with the alkali metal before being activated with the electrolyte, the DMC, EMC and DEC are in an essentially equilibrated mixture, by molar percent, as determined by the formula: $[EMC]^2/([DMC][DEC])$ equal to about 4.0±0.15 and wherein in the equilibrated molar mixture, the rate at which ethyl methyl carbonate is producible from dimethyl carbonate and diethyl carbonate by an ester exchange reaction is essentially equal to the rate at which ethyl methyl carbonate is disproportionable into dimethyl carbonate and diethyl carbonate such that the equilibrated molar mixture of dimethyl carbonate, diethyl carbonate and ethyl methyl carbonate essentially does not change as the cell discharges.

2. The electrochemical cell of claim 1 wherein the carbonate solvent mixture further includes at least one cyclic carbonate selected from the group consisting of ethylene carbonate, propylene carbonate, butylene carbonate and vinylene carbonate.

3. An electrochemical cell, which comprises:
    a) a negative electrode of a negative electrode active material which intercalates and deintercalates with lithium;
    b) a positive electrode comprising a lithiated electrode active material which intercalates and deintercalates with lithium; and
    c) an electrolyte solution activating the negative and positive electrodes, the electrolyte including an alkali metal salt dissolved in a mixture comprising dimethyl carbonate (DMC), ethyl methyl carbonate (EMC) and diethyl carbonate (DEC), wherein with the negative electrode deintercalated with lithium and the positive electrode intercalated with lithium before being activated with the electrolyte, the dimethyl carbonate, the ethyl methyl carbonate and the diethyl carbonate are in an essentially equilibrated molar mixture as determined by the graph of:

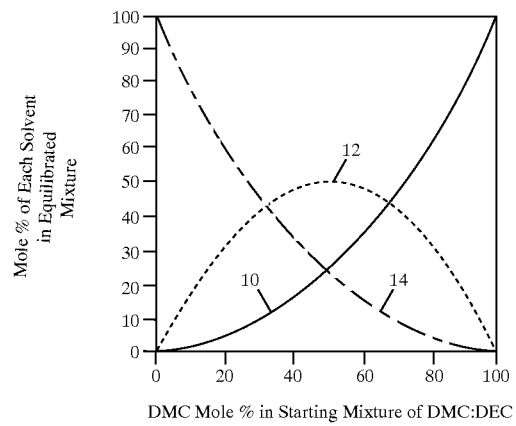

DMC Mole % in Starting Mixture of DMC:DEC d) wherein from a beginning molar mixture of DMC and DEC solvents in a ratio of a% of DMC and 1−a% of DEC entered on the abscissa of the graph and then from the a(DMC)% point moving up the y-intersect to determine the equilibrated molar mixture by intersecting curve 10 to get the equilibrated molar percentage of DMC, intersecting curve 12 to get the equilibrated molar percentage of ENG and intersecting curve 14 to get the equilibrated molar percentage of DEC; and
    e) wherein in the equilibrated molar mixture, the rate at which ethyl methyl carbonate is producible from dimethyl carbonate and diethyl carbonate by an ester exchange reaction is essentially equal to the rate at which ethyl methyl carbonate is disproportionable into dimethyl carbonate and diethyl carbonate such that the equilibrated molar mixture of dimethyl carbonate, diethyl carbonate and ethyl methyl carbonate essentially does not change as the cell discharges.

4. The electrochemical cell of claim 3 wherein the electrolyte further includes ethylene carbonate in the range of about 20% to about 50%, and the dimethyl carbonate is in the range of about 12% to about 75%, the ethyl methyl carbonate is in the range of about 5% to about 45%, and the diethyl carbonate is in the range of about 3% to about 45%, by molar.

5. The electrochemical cell of claim 3 wherein the electrolyte includes a salt selected from the group consisting of $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

6. The electrochemical cell of claim 3 wherein the negative electrode active material is selected from the group consisting of coke, carbon black, graphite, acetylene black, carbon fibers, a glassy carbon, and mixtures thereof.

7. The electrochemical cell of claim 3 wherein the negative electrode active material is mixed with a fluoro-resin binder.

8. The electrochemical cell of claim 3 wherein the lithiated electrode active material is selected from the group consisting of lithiated oxides, lithiated sulfides, lithiated selenides and lithiated tellurides of the group selected from vanadium, titanium, chromium, copper, molybdenum, niobium, iron, nickel, cobalt, manganese, and mixtures thereof.

9. The electrochemical cell of claim 8 wherein the lithiated electrode active material is mixed with a fluoro-resin binder.

10. The electrochemical cell of claim 8 wherein the lithiated electrode active material is mixed with a conductive addition selected from the group consisting of acetylene black, carbon black, graphite, nickel powder, aluminum powder, titanium powder, stainless steel powder, and mixtures thereof.

11. An electrochemical cell, which comprises:
   a) a negative electrode of a carbonaceous material which intercalates and deintercalates with lithium;
   b) a positive electrode comprising lithium cobalt oxide which intercalates and deintercalates with lithium; and
   c) an electrolyte solution activating the negative electrode and the positive electrode, the electrolyte including a lithium salt dissolved in a mixture comprising dimethyl carbonate (DMC), ethyl methyl carbonate (EMC) and diethyl carbonate (DEC), wherein with the negative electrode deintercalated with lithium and the positive electrode intercalated with lithium before being activated with the electrolyte, the dimethyl carbonate, the ethyl methyl carbonate and the diethyl carbonate are in an essentially equilibrated molar mixture as determined by the graph of:

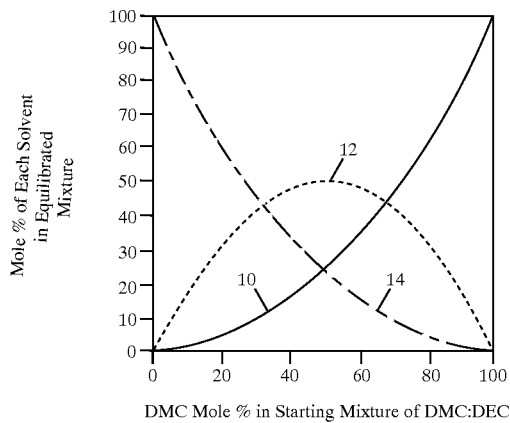

wherein from a beginning molar mixture of DMC and DEC solvents in a ratio of a% of DMC and 1−a% of DEC entered on the abscissa of the graph and then from the a(DMC)% point moving up the y-intersect to determine the equilibrated molar mixture by intersecting curve 10 to get the equilibrated molar percentage of DMC, intersecting curve 12 to get the equilibrated molar percentage of EMC and intersecting curve 14 to get the equilibrated molar percentage of DEC; and d) wherein in the equilibrated molar mixture, the rate at which ethyl methyl carbonate is producible from dimethyl carbonate and diethyl carbonate by an ester exchange reaction is essentially equal to the rate at which ethyl methyl carbonate is disproportionable into dimethyl carbonate and diethyl carbonate such that the equilibrated molar mixture of dimethyl carbonate, diethyl carbonate and ethyl methyl carbonate essentially does not change as the cell discharges.

12. A method for converting chemical energy to electrical energy from an electrochemical cell, comprising the steps of:

a) providing a negative electrode comprising a carbonaceous negative electrode active material which intercalates and deintercalates with an alkali metal;
   b) providing a positive electrode comprising an alkali metal intercalated electrode active material which intercalates and deintercalates with the alkali metal;
   c) providing an electrolyte including an alkali metal salt dissolved in a mixture comprising dimethyl carbonate (DMC), ethyl methyl carbonate (EMC) and diethyl carbonate (DEC);
   d) assembling the negative electrode deintercalated with the alkali metal and the positive electrode intercalated with the alkali metal before activating the negative electrode and the positive electrode with the electrolyte, the electrolyte having from a beginning molar mixture of DMC and DEC solvents in a ratio of a% of DMC and 1−a% of DEC, the DMC, EMC and DEC in an essentially equilibrated mixture, by molar percent, as determined by the formula: $[EMC]^2/([DMC][DEC])$ equal to about 4.0±0.15; and
   e) re-charging the cell a first time with the negative electrode intercalating the alkali metal and the positive electrode deintercalating the alkali metal, wherein in the equilibrated molar mixture, the rate at which ethyl methyl carbonate is producible from dimethyl carbonate and diethyl C carbonate by an ester exchange reaction is essentially equal to the rate at which ethyl methyl carbonate is disproportionable into dimethyl carbonate and diethyl carbonate such that the equilibrated molar mixture of dimethyl carbonate, diethyl carbonate and ethyl methyl carbonate essentially does not change as the cell discharges.

13. The method of claim 12 including providing the carbonate solvent mixture further having at least one cyclic carbonate selected from the group consisting of ethylene carbonate, propylene carbonate, butylene carbonate and vinylene carbonate.

14. A method for providing an electrochemical cell, comprising the steps of:
   a) providing a negative electrode comprising a negative electrode active material which intercalates and deintercalates with lithium;
   b) providing a positive electrode comprising a lithiated electrode active material which intercalates and deintercalates with lithium; and
   c) providing an electrolyte including an alkali metal salt dissolved in a mixture comprising dimethyl carbonate (DMC), ethyl methyl carbonate (EMC) and diethyl carbonate (DEC);
   d) assembling the cell having the negative electrode deintercalated with the lithium and the positive electrode intercalated with lithium before activating the negative electrode and the positive electrode with the electrolyte having the dimethyl carbonate, the ethyl methyl carbonate and the diethyl carbonate in an essentially equilibrated molar mixture as determined by the graph of:

c) diethyl carbonate (DEC), wherein the DMC, EMC and DEC are in an essentially equilibrated molar

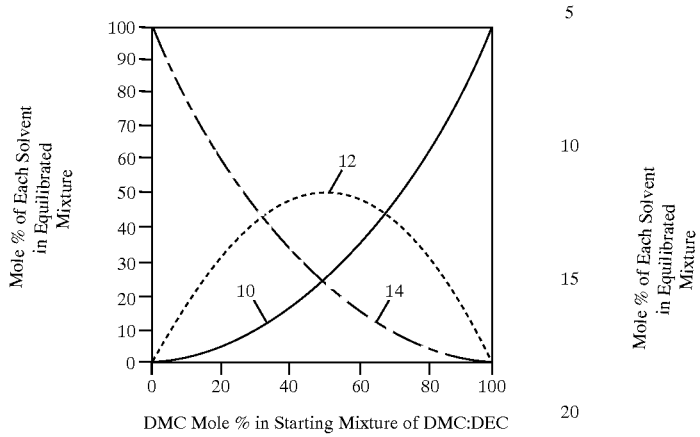

DMC Mole % in Starting Mixture of DMC:DEC

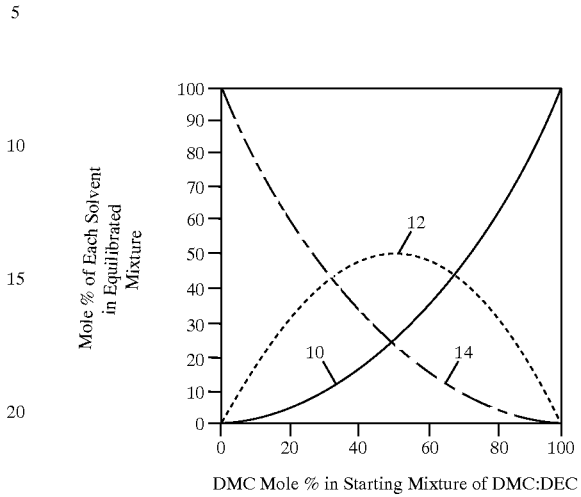

DMC Mole % in Starting Mixture of DMC:DEC mixture as determined by the graph of:

d) wherein from a beginning molar mixture of DMC and DEC solvents in a ratio of a% of DMC and 1−a% of DEC entered on the abscissa of the graph and then from the a(DMC)% point moving up the y-intersect to determine the equilibrated molar mixture by intersecting curve 10 to get the equilibrated molar percentage of DMC, intersecting curve 12 to get the equilibrated molar percentage of EMC and intersecting curve 14 to get the equilibrated molar percentage of DEC.

19. The electrolyte of claim 18 comprising ethylene carbonate mixed with the equilibrated molar mixture of DMC, EMC and DEC.

20. The electrolyte of claim 18 wherein the electrolyte further includes ethylene carbonate in the range of about 20% to about 50%, and the dimethyl carbonate is in the range of about 12% to about 75%, the ethyl methyl carbonate is in the range of about 5% to about 45%, and the diethyl carbonate is in the range of about 3% to about 45%, by molar.

21. The electrolyte of claim 18 further including an alkali metal salt selected from the group consisting of $LiPF_6$, $LiBF_4$, $LiAsF_6$, $LiSbF_6$, $LiClO_4$, $LiAlCl_4$, $LiGaCl_4$, $LiNO_2$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

22. A method for providing an electrolyte, comprising the steps of:

a) providing a beginning molar mixture of dimethyl carbonate (DMC) and diethyl carbonate (DEC); and b) determining an essentially equilibrated molar mixture of DMC, DEC and ethyl methyl carbonate (EMC) by the graph of:

wherein from a beginning molar mixture of DMC and DEC solvents in a ratio of a% of DMC and 1−a% of DEC entered on the abscissa of the graph and then from the a(DMC)% point moving up the y-intersect to determine the equilibrated molar mixture by intersecting curve 10 to get the equilibrated molar percentage of DMC, intersecting curve 12 to get the equilibrated molar percentage of EMC and intersecting curve 14 to get the equilibrated molar percentage of DEC; and e) re-charging the cell a first time with the negative electrode intercalating the alkali metal and the positive electrode deintercalating the alkali metal such that the rate at which EMC is producible from DMC and DEC by an ester exchange reaction is essentially equal to the rate at which EMC is disproportionable into DMC and DEC such that the equilibrated molar mixture of DMC, DEC and ENG essentially does not change upon further charging and discharging of the cell.

15. The method of claim 14 wherein the electrolyte further includes ethylene carbonate in the range of about 20% to about 50%, and the dimethyl carbonate is in the range of about 12% to about 75%, the ethyl methyl carbonate is in the range of about 5% to about 45%, and the diethyl carbonate is in the range of about 3% to about 45%, by molar.

16. The method of claim 14 wherein the alkali metal salt is selected from the group consisting of $LiPF_6$, $LiBF_4$, $LiAsF_6$, $LiSbF_6$, $LiClO_4$, $LiAlCl_4$, $LiGaCl_4$, $LiNO_2$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

17. The method of claim 14 including selecting the negative electrode active material from the group consisting of coke, carbon black, graphite, acetylene black, carbon fibers, glassy carbon, and mixtures thereof.

18. An electrolyte for activating an electrochemical cell, the electrolyte comprising:

a) dimethyl carbonate (DMC);

b) ethyl methyl carbonate (EMC); and

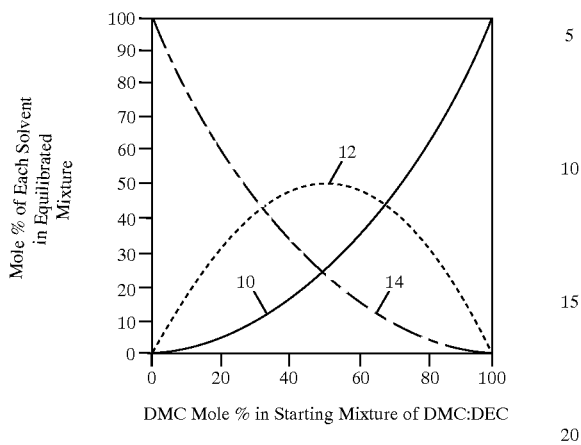

DMC Mole % in Starting Mixture of DMC:DEC wherein from a beginning molar mixture of DMC and DEC solvents in a ratio of a% of DMC and 1−a% of DEC entered on the abscissa of the graph and then from the a(DMC)% point moving up the y-intersect to determine the equilibrated molar mixture by intersecting curve 10 to get the equilibrated molar percentage of DMC, intersecting curve 12 to get the equilibrated molar percentage of EMC and intersecting curve 14 to get the equilibrated molar percentage of DEC.

23. The method of claim 22 including mixing ethylene carbonate with the equilibrated molar mixture of DMC, EMC and DEC.

24. The method of claim 22 wherein the electrolyte further includes ethylene carbonate in the range of about 20% to about 50%, and the dimethyl carbonate is in the range of about 12% to about 75%, the ethyl methyl carbonate is in the range of about 5% to about 45%, and the diethyl carbonate is in the range of about 3% to about 45%, by molar.

25. The method of claim 22 further including providing the electrolyte having a salt selected from the group consisting of $LiPF_6$, $LiBF_4$, $LiAsF_6$, $LiSbF_6$, $LiClO_4$, $LiAlCl_4$, $LiGaCl_4$, $LiNO_2$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

26. An electrochemical cell, which comprises:
a) a negative electrode of a negative electrode active material which intercalates and deintercalates with lithium;
b) a positive electrode comprising a lithiated electrode active material which intercalates and deintercalates with lithium; and
c) an electrolyte solution activating the negative and positive electrodes, the electrolyte including an alkali metal salt dissolved in a mixture comprising dimethyl carbonate (DMC), ethyl methyl carbonate (ENG) and diethyl carbonate (DEC), wherein with the negative electrode deintercalated with lithium and the positive electrode intercalated with lithium before being activated with the electrolyte, the dimethyl carbonate, the ethyl methyl carbonate and the diethyl carbonate are in an essentially equilibrated molar mixture as determined by the graph of:

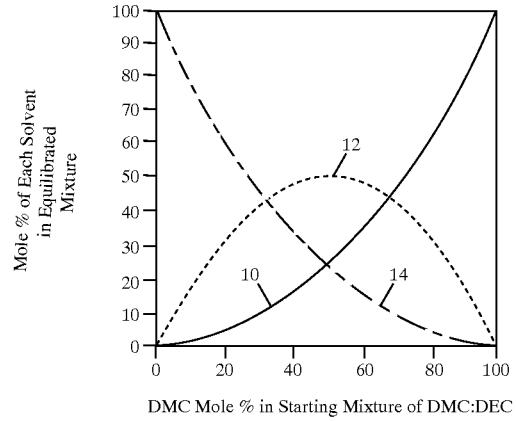

DMC Mole % in Starting Mixture of DMC:DEC d) wherein the equilibrated molar mixture is determined by intersecting curves 10, 12 and 14 with a line projecting from the abscissa of the graph and aligned parallel to the ordinate, and wherein the intersection of the line with curve 10 is the equilibrated molar percentage of DMC, the intersection of the line with curve 12 is the equilibrated molar percentage of EMC and the intersection of the line with curve 14 is the equilibrated molar percentage of DEC; and e) wherein in the equilibrated molar mixture, the rate at which ethyl methyl carbonate is producible from dimethyl carbonate and diethyl carbonate by an ester exchange reaction is essentially equal to the rate at which ethyl methyl carbonate is disproportionable into dimethyl carbonate and diethyl carbonate such that the equilibrated molar mixture of dimethyl carbonate, diethyl carbonate and ethyl methyl carbonate essentially does not change as the cell discharges.

27. A method for providing an electrochemical cell, comprising the steps of:
a) providing a negative electrode comprising a negative electrode active material which intercalates and deintercalates with lithium;
b) providing a positive electrode comprising a lithiated electrode active material which intercalates and deintercalates with lithium; and
c) providing an electrolyte including an alkali metal salt dissolved in a mixture comprising dimethyl carbonate (DMC), ethyl methyl carbonate (EMC) and diethyl carbonate (DEC);
d) assembling the cell having the negative electrode deintercalated with the lithium and the positive electrode intercalated with lithium before activating the negative electrode and the positive electrode with the electrolyte having the dimethyl carbonate, the ethyl methyl carbonate and the diethyl carbonate in an essentially equilibrated molar mixture as determined by the graph of:

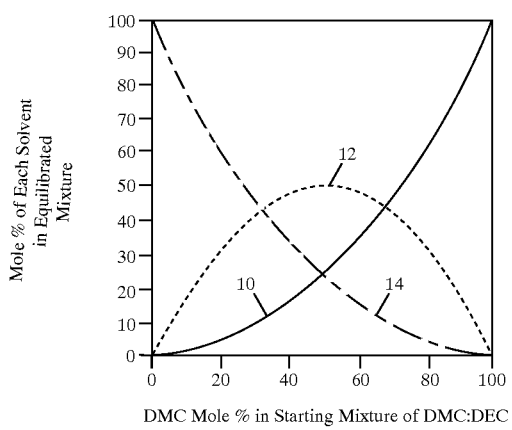

DMC Mole % in Starting Mixture of DMC:DEC wherein the equilibrated molar mixture is determined by intersecting curves 10, 12 and 14 with a line projecting from the abscissa of the graph and aligned parallel to the ordinate, and wherein the intersection of the line with curve 10 is the equilibrated molar percentage of DMC, the intersection of the line with curve 12 is the equilibrated molar percentage of EMC and the intersection of the line with curve 14 is the equilibrated molar percentage of DEC; and f) re-charging the cell a first time with the negative electrode intercalating the alkali metal and the positive electrode deintercalating the alkali metal such that the rate at which EMC is producible from DMC and DEC by an ester exchange reaction is essentially equal to the rate at which EMC is disproportionable into DMC and DEC such that the equilibrated molar mixture of DMC, DEC and EMC essentially does not change upon further charging and discharging of the cell.

28. An electrolyte for activating an electrochemical cell, the electrolyte comprising:
a) dimethyl carbonate (DMC);
b) ethyl methyl carbonate (EMC); and
c) diethyl carbonate (DEC), wherein the DMC, EMC and DEC are in an essentially equilibrated molar mixture as determined by the graph of:

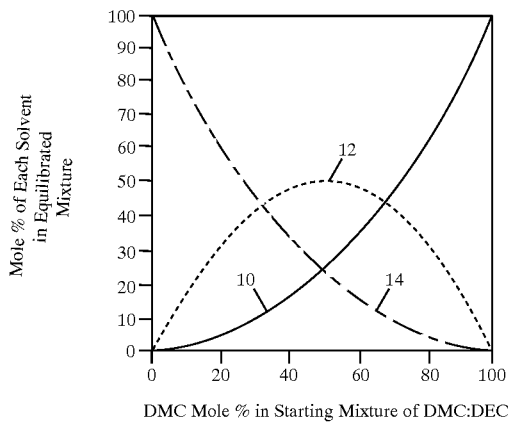

DMC Mole % in Starting Mixture of DMC:DEC d) wherein the equilibrated molar mixture is determined by intersecting curves 10, 12 and 12 with a line projecting from the abscissa of the graph and aligned parallel to the ordinate, and wherein the intersection of the line with curve 10 is the equilibrated molar percentage of DMC, the intersection of the line with curve 12 is the equilibrated molar percentage of ENG and the intersection of the line with curve 14 is the equilibrated molar percentage of DEC.

29. A method for providing an electrolyte, comprising the steps of:
a) determining an essentially equilibrated molar mixture of DMC, DEC and ethyl methyl carbonate (EMC) by the graph of:

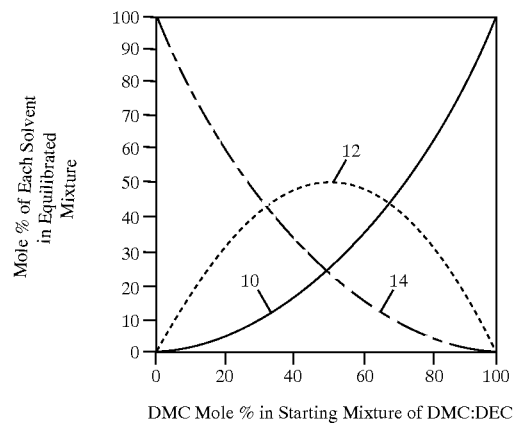

DMC Mole % in Starting Mixture of DMC:DEC wherein the equilibrated molar mixture is determined by intersecting curves 10, 12 and 14 with a line projecting from the abscissa of the graph and aligned parallel to the ordinate, and wherein the intersection of the line with curve 10 is the equilibrated molar percentage of DMC, the intersection of the line with curve 12 is the equilibrated molar percentage of EMC and the intersection of the line with curve 14 is the equilibrated molar percentage of DEC.

* * * * *

UNITED STATES PATENT AND TRADEMARK OFFICE
CERTIFICATE OF CORRECTION

PATENT NO. : 6,746,804 B2
DATED : June 8, 2004
INVENTOR(S) : Hong Gan et al.

It is certified that error appears in the above-identified patent and that said Letters Patent is hereby corrected as shown below:

Column 17,
Line 29, before "including" please delete "(";

Column 18,
Line 32, "ENG" should read -- EMC --;

Column 20,
Line 31, after "diethyl" please delete "C";

Column 21,
Line 40, "ENG" should read -- EMC --;

Column 22,
Lines 1-25, should read
-- c) diethyl carbonate (DEC), wherein the DMC, EMC and DEC are in an essentially equilibrated molar mixture as determined by the graph of:

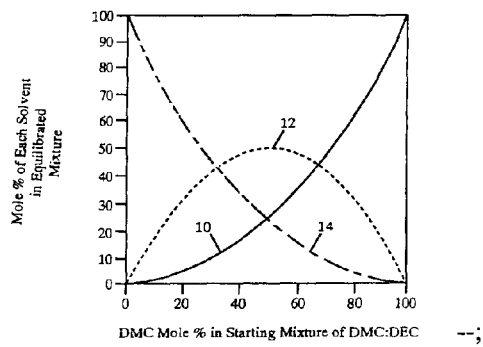

--;

Column 23,
Line 62, "ENG" should read -- EMC --;

Column 25,
Line 19, before "wherein" please insert -- e) --;

UNITED STATES PATENT AND TRADEMARK OFFICE
CERTIFICATE OF CORRECTION

PATENT NO. : 6,746,804 B2
DATED : June 8, 2004
INVENTOR(S) : Hong Gan et al.

It is certified that error appears in the above-identified patent and that said Letters Patent is hereby corrected as shown below:

Column 26,
Line 2, "12", second occurrence, should read -- 14 --; and
Line 9, "ENG" should read -- EMC --.

Signed and Sealed this

Seventh Day of September, 2004

JON W. DUDAS
*Director of the United States Patent and Trademark Office*